(12) United States Patent
Inoue et al.

(10) Patent No.: US 7,283,730 B1
(45) Date of Patent: Oct. 16, 2007

(54) OPTICAL DISC CAMCORDER

(75) Inventors: Naoki Inoue, Kanagawa (JP); Masaru Tezuka, Kanagawa (JP); Shigeaki Koike, Kanagawa (JP)

(73) Assignee: Sony Corporation (JP)

( * ) Notice: Subject to any disclaimer, the term of this patent is extended or adjusted under 35 U.S.C. 154(b) by 672 days.

(21) Appl. No.: 09/671,688

(22) Filed: Sep. 28, 2000

(30) Foreign Application Priority Data

Sep. 29, 1999 (JP) ............................... P11-276917

(51) Int. Cl.
*H04N 5/00* (2006.01)
*H04N 5/225* (2006.01)

(52) U.S. Cl. .................. 386/117; 386/38; 386/107; 386/121; 386/118; 348/207.1

(58) Field of Classification Search ................ 386/118, 386/46, 95, 96, 125, 126, 117, 38, 107, 121; 348/36, 53, 373, 374, 375, 376, 207.1; 720/605, 720/648, 651, 657, 652, 640
See application file for complete search history.

(56) References Cited

U.S. PATENT DOCUMENTS 5,303,062 A * 4/1994 Kawarai et al. ............ 386/118
5,881,034 A 3/1999 Mano
6,141,034 A * 10/2000 McCutchen .................. 348/36
6,628,338 B1 * 9/2003 Elberbaum et al. ......... 348/373

FOREIGN PATENT DOCUMENTS

| EP | 0 851 422 | * 12/1996 |
| EP | 0 851 422 | 7/1998 |
| JP | 0271869 A1 | * 6/1998 |
| JP | 11 18040 | 1/1999 |
| WO | 98 22949 | 5/1998 |

* cited by examiner

*Primary Examiner*—John Miller
*Assistant Examiner*—Jamie J Vent
(74) *Attorney, Agent, or Firm*—Rader Fishman & Grauer PLLC; Ronald P. Kananen

(57) ABSTRACT

The present invention provides an optical disc camcorder unit having a base plate assembly loaded with an optical disc and a camcorder main body accommodating the base plate assembly, the base plate assembly is swingably set to the camcorder main body via a rotating shaft so that the base plate assembly rotates in an axial direction about the rotating shaft. In this manner the optical disc camcorder provides improved recording and reproduction characteristic and improved tracking performance by way of preventing rolling generated by in the camcorder unit from being transmitted to internal base plate assembly and also preventing skew and oscillation of spindle motor shaft from being generated.

2 Claims, 23 Drawing Sheets

MAIN-BODY ROLLING PHENOMENON

MAIN-BODY ROLLING PHENOMENON

ACCELERATION DEGREE -DIRECTION
ACCELERATION DEGREE +DIRECTION
ACCELERATION DEGREE -DIRECTION
ACCELERATION DEGREE +DIRECTION

MAIN-BODY ROLLING PHENOMENON

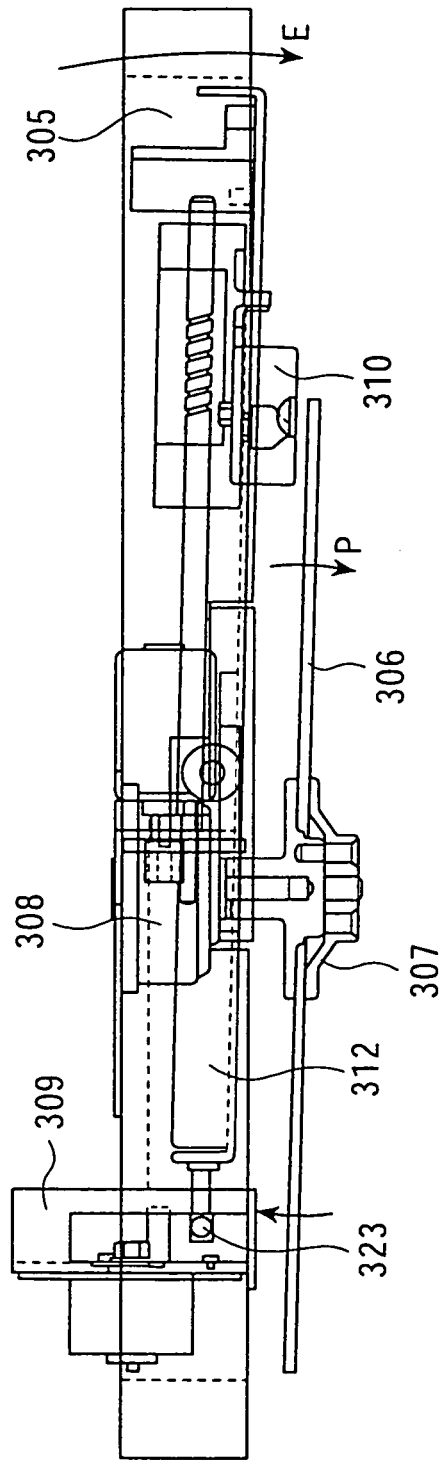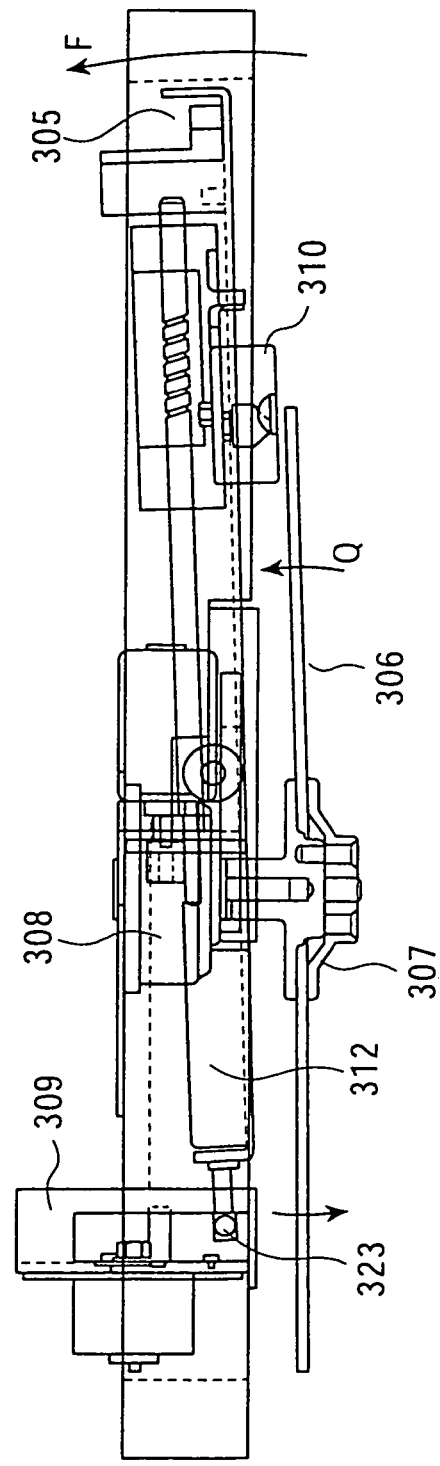

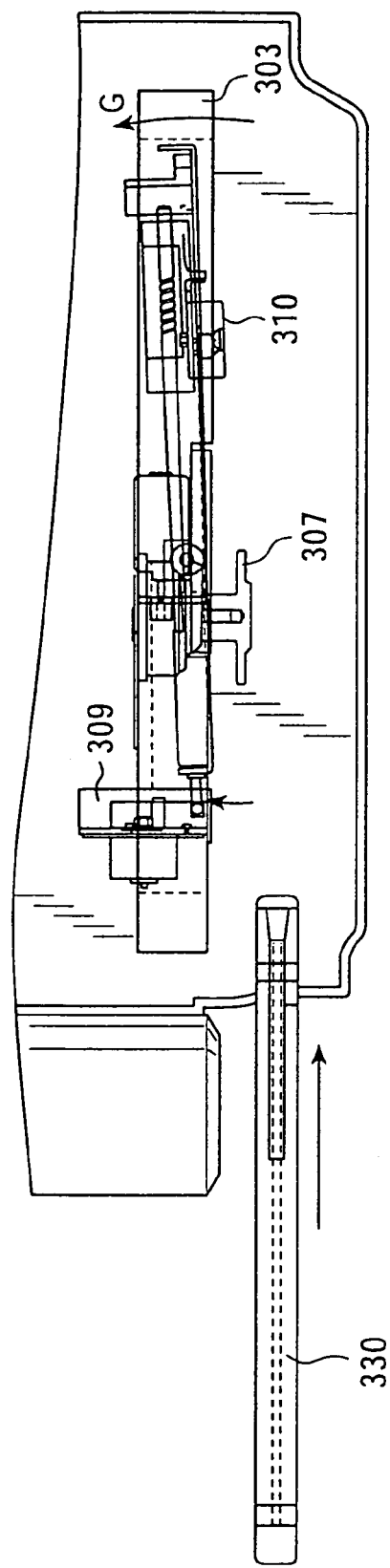
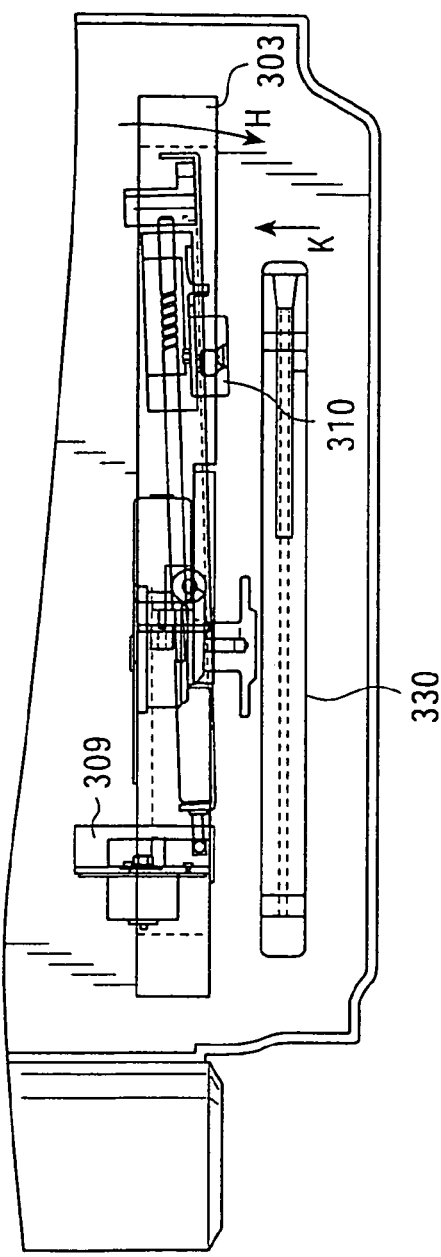
FIG. 17A
FIG. 17B

ROLLING GENERATED IN THE MAIN BODY

ROLLING GENERATED IN THE MAIN BODY

OPTICAL DISC CAMCORDER

BACKGROUND OF THE INVENTION

1. Field of the Invention

The present invention relates to an optical disc camcorder, in particular, the invention relates to means for correcting a skew which is caused between an optical disc and an optical pickup unit by effect of rolling generated in the camcorder.

2. Description of the Related Art

Basically, an optical disc camcorder integrally comprising a camera unit and a recorder unit using an optical disc as its recording medium converts video and audio data received by the camera unit into AV data signals for recording them onto the optical disc and then records the converted digital signal onto an optical-disc track via an optical pickup system.

The optical pickup system executes recording of data signal by varying composition of the recording surface of the optical disc by way of condensing laser beams emitted from a semiconductor laser making up the light-emitting source onto an objective track position on the optical disc as of a minimal spot form via intermediate optical components and a laser-emitting object lens. Further, the optical pickup system executes reproduction of data signal by way of reading reflective light from the optical disc as an electrical signal via photoelectric conversion element such as a photo-detector or the like.

The object lens of the optical pickup system for emitting laser beam is subject to focus control performed against optical disc recording surface set to a biaxial actuator and also subject to tracking control in order that a condensed light spot can precisely follow up the track on the optical disc.

Perpendicularity between an optical axis of the object lens and the recording surface of the optical disc is one of extremely important factors to determine signal recording and reproduction characteristics. Deflection of the perpendicularity is called "skew". For any reason, if the optical disc ever deforms, a skew is generated between the optical axis of the object lens and the recording surface of the optical disc. This in turn causes aberration including coma aberration, astigmatic aberration, spherical aberration, or the like, to be generated in the light spot condensed onto the optical disc, thus degrading signal recording and reproduction characteristics.

FIGS. 18A and 18B are explanatory views of "skew" phenomenon, in which FIG. 18A designates a case in which no skew is present, and FIG. 18B designates a case in which a skew is generated. FIG. 18A shows a case in which optical axis C of the object lens of an optical pickup system 2 correctly matches the normal line (the line perpendicular to the optical-disc surface) of an optical disc 1. FIG. 18B shows a case in which the optical disc 1 is tilted to cause the normal line P to be inclined against the optical axis C of the object lens of the optical pickup system 2, whereby resulting in the occurrence of the skew.

FIGS. 19A and 19B graphically designate variation of RF-jitter components (high-frequency jitter components) during the signal reproduction process in accordance with the variation of "skew". The expression "Rad" direction indicates a seek direction of the optical pickup system 2, i.e., the normal line direction of the track of the optical disc 1. The expression "Tan" direction indicates a tangential direction of the track of the optical disc 1. As exemplified in FIGS. 19A and 19B, generation of even the slightest degree of skew in the "Rad" and "Tan" directions causes the jitter components to be grown very sharply.

Whenever being used for broadcast stations or AV-related business sectors, higher picture quality, higher audio quality, and higher reliability, are essentially demanded for the optical disc camcorders at large.

FIGS. 20A and 20B exemplify overall configuration of such a high-performance optical disc camcorder, in which FIG. 20A designates a rear view, whereas FIG. 20B designates a lateral view. Likewise, FIGS. 21A and 21B exemplify posture of image-pickup operation by way of actually using the optical-disc camcorder, in which FIG. 21A designates a rear view, whereas FIG. 21B designates a lateral view.

Actually, any of conventional optical-disc camcorders has realized such a dimension and weight substantially being equivalent to those of any camera-combined VTR making use of a conventionally available videotape as a recording medium. In terms of the image-pickup posture using such a conventional optical disc camcorder, as is shown in FIGS. 21A and 21B, while a photographer remains still, the camera (i.e., an optical-disc camcorder) is rarely affected by oscillation. However, when performing image-pickup operation while the photographer moves on himself (while keeps on running himself for example), the camera may hit against his head, and then, as is shown in FIGS. 22A and 22B, oscillation will act itself as rolling force in the direction R. When the photographer performs image-pickup operation at a low angle while bearing the camera with his hands, oscillation similar to the above case will affect the camera body. This is called "rolling phenomenon" of the camera body.

Once the rolling phenomenon is generated in the camera main body, the rolling effect is transmitted to the base plate assembly (a mechanical block being composed of an optical pickup system, a seek mechanism thereof, a spindle-motor chucking mechanism and an optical disc) inside of the main body, whereby causing gyro-moment to act on an optical disc 8 being rotated inside of the main body to cause the optical disc 8 to be deformed as shown in FIGS. 23A and 23B. Referring to FIG. 23A, X designates a horizontal axis against the camcorder main body 4 passing through the center of the rotation of the optical disc 8, where the horizontal axis X is in the direction identical to the optical axis of a camera lens 7 and also identical to the seek direction of the optical pickup system 2. On the other hand, Y designates a vertical axis against the camcorder main body 4 orthogonally intersecting the horizontal axis X via the center of the rotation of the optical disc 8. R designates a rolling direction, J designates a direction in which a gyro moment is generated, and D designates a direction in which the optical disc 8 rotating in the direction S is deformed by the gyro moment. FIG. 23B shows an upper surface portion of the camcorder main body 4 shown in FIG. 23A, in which Z designates an axis of the rotation of the optical disc 8. Because of the deformation of the optical disc 8, the above-referred skew is generated between the optical axis of the object lens of the optical pickup system and the optical-disc recording surface, whereby resulting in the degraded signal recording and reproduction characteristics.

As described above, any of the conventional optical-disc camcorders using an optical disc as the recording medium is subject to generation of rolling phenomenon to cause gyro-moment to affect the rotating optical disc to further cause the optical disc to be deformed, and yet, the rolling also causes spindle-motor shaft rotating itself in linkage with the optical disc to incur swing movement (or tilt). As a result of the deformation of the optical disc, skew (in other words, deflection in the perpendicularity) is generated between the optical axis of the object lens of the optical pickup system and the optical-disc recording surface, thus degrading signal recording and reproduction characteristics. And yet, swing movement of the spindle-motor shaft deflects track to result in the degraded tracking performance.

To cope with externally applied oscillation or shock incurring to any of the conventional optical-disc camcorders, such a shock-proof structure to prevent the base plate assembly from directly incurring oscillation and shock by way of protecting the base plate assembly inside of the main cubic-type casing with a spring or a rubber damper has been adopted.

Nevertheless, it has not been possible to fully shield oscillation and shock incurring to the base plate assembly merely by means of the conventional spring or rubber damper. Actually, once rolling phenomenon ever occurs in the main casing, rolling phenomenon still affects the base plate assembly to subsequently cause the optical disc to incur gyro moment, whereby generating skew between the optical axis of the object lens of the optical pickup system and the optical-disc recording surface, and yet, it also causes tilt (swing movement) to be generated on the part of the spindle motor shaft to cause signal recording and reproduction characteristic and the tracking performance to eventually incur degradation.

Actually, any of the above-cited conventional optical-disc camcorders is subject to electrical control in order that distance between the object lens of the optical pickup system and the optical-disc surface can be held constant (in other words, within focal distance of the object lens, more precisely, within focal depth range) as of the condition in which the optical pickup system executing signal recording and reproduction is not in contact with the optical disc. Nevertheless, for any reason, if the optical disc ever deforms, perpendicularity between the optical axis of the object lens and the optical-disc recording surface deflects to cause skew to be generated. The skew gravely affects the signal recording and reproduction characteristic. In particular, it is known that, in the case of the optical disc camcorder, since rolling is generated during the image-pickup operation as was described above, gyro moment adversely affects the rotating optical disc to cause the optical disc to be deformed.

SUMMARY OF THE INVENTION

The present invention has been devised in consideration of the above-referred conventional art. The object of the invention is to provide a novel optical disc camcorder which makes it possible to prevent rolling phenomenon generated in the camcorder body from being transmitted to the internally accommodated base plate assembly and also prevent skew phenomenon and swing movement of the spindle motor shaft from occurrence, whereby aiming at further improvement of the signal recording and reproduction characteristics and tracking performance as well.

To achieve the above object, the invention provides a novel optical disc camcorder comprising a base plate assembly loaded with an optical disc and a camcorder main body accommodating the base plate assembly, where the base plate assembly is swingably secured to the camcorder main body via a horizontally rotating shaft and a weight is provided so that the center of the gravity of the base plate assembly is disposed below the above-referred horizontally rotating shaft.

According to the above structure, the horizontally rotating shaft is disposed between the interior portion of the camcorder main body and the base plate assembly. According to the horizontally rotating shaft, the base plate assembly is rotated in the direction of canceling rolling phenomenon, i.e., in the horizontal direction in which the rolling phenomenon mostly occurs while the optical disc camcorder is actually operated.

In addition, even when the rolling is generated in the camcorder main body, the above-referred base plate assembly independently maintains stationary posture constantly being vertical to the ground. More specifically, even when the camcorder main body is rotated due to the rolling effect being generated, because of the relationship between the rotating shaft and the center of the gravity, it is possible for the base plate assembly to hold on vertically stationary posture against the ground surface by way of independently rotating itself in the direction to cancel the rolling phenomenon in the periphery of the rotating shaft without utilizing any specific drive mechanism.

According to another preferred structural example, a locking mechanism is disposed in order to fixedly secure the base plate assembly to the camcorder main body whenever being required.

According to the above-referred example, when locking means is required, provision of the locking mechanism prevents the base plate assembly from being rotated in the state in which no optical disc is present in the camcorder main body or power supply remains OFF inside of the main body, for example, whereby assuredly preventing the base plate assembly from being rotated unpreparedly in a case of other than image-pickup operation or reproduction of recorded data.

According to another preferred structural example, a stopper means is provided in order to restrict a range of swing operation of the base plate assembly in the periphery of the rotating shaft and also absorb unwanted shock.

According to the above-referred example, even when rolling phenomenon beyond normal angular amplitude or shock with excessive magnitude ever occurs, by way of utilizing stopper means such as a gear damper capable of attenuating and halting rotation of the base plate assembly beyond the maximum angle range for allowing rotary movement of the base plate assembly, the base plate assembly can be prevented from rotating itself beyond a specific angle in the periphery of the above-referred rotating shaft, and yet, shock incidental to the halt of the rotation can also be absorbed.

According to a further preferred structural example, an acceleration sensor is provided for the optical-disc camcorder in order to detect the actual amount of acceleration of the rotation of the base plate assembly, and yet, a rotation drive mechanism is also provided so as to cause the base plate assembly to be rotated compulsorily in the periphery of the above-referred rotating shaft in correspondence with the value detected by the acceleration sensor.

According to the above-referred structural example, it is possible to detect acceleration degree (i.e., angular speed) at the time of causing the base plate assembly to rotate itself in the periphery of the above-referred rotating shaft. Further, whenever the rolling phenomenon has been generated in the camcorder main body, the above-referred rotation drive mechanism causes the base plate assembly to be rotated compulsorily in a direction of constantly canceling the acceleration amount into zero so that the base plate assembly can be prevented from rotating itself in pursuit of the rolling phenomenon. By virtue of the above arrangement, posture of the base plate assembly is properly controlled in order that the base plate assembly can maintain constant posture against the ground surface all the time.

The present invention further provides a novel optical disc camcorder which comprises a base plate which is held inside of the camcorder main body via a damper and on which an optical-disc turn table, a spindle motor for activating rotation of the optical-disc turn table, an optical image pickup system and an optical pickup seek operation mechanism thereon, wherein: in conjunction with the above optical pickup seek operation mechanism, the above-referred optical image pickup system is mounted on a sub-base which is rotatably secured to the above-referred base plate. The novel optical disc camcorder related to the present invention further comprises a skew-correcting mechanism which corrects skew by causing the above-referred sub-base to rotate against the base plate fitted with the optical-disc turn table and the spindle motor.

According to the above-referred structure, in order to cope with deformation of the optical disc caused by gyro moment generated inside of the optical disc camcorder, the optical pickup system and the seek mechanism thereof are disposed on the sub-base. The above-referred skew correcting mechanism executes angular control of the sub-base against the base plate having thereon the spindle motor which fixedly rotates the optical disc. This enables the inventive optical disc camcorder to properly adjust angle of the optical axis of the object lens of the optical pickup system so that the optical axis will be able to remain at the optimal condition without being skewed at all constantly.

According to a still further preferred example, a rotary shaft for operating the skew correcting mechanism is secured to an end point of the optical-disc turn table.

According to the above-referred structure, a rotary shaft for angular control is secured to the end point of the optical-disc turn table. As a result, in a case of positively correcting skew to cope with deformation of the optical disc caused by the rolling of the camcorder main body, distance between the object lens and the optical disc surface can always be held constant. Accordingly, distance between the object lens and the optical disc surface remains constant within the movable range of focus stroke of a biaxial actuator, thus preventing the object lens from improperly being focused. Further, the above arrangement prevents the optical disc from being damaged otherwise caused by collision with the object lens or the biaxial actuator.

Further, because of capability to expand the movable range of the above-referred skew correcting mechanism (by ±15 degrees for example), whenever inserting an optical disc or a cartridge into the camcorder main body utilizing the skew correcting mechanism, the optical disc is held being apart from the optical pickup system, whereby preventing the optical pickup system from being damaged via contact with the optical disc. In the event if abnormal shock ever acts on the camcorder main body to result in the sizable deformation of the optical disc, by allowing the optical pickup system to depart from the optical disc, the optical pickup system can be prevented from incurring damage otherwise caused by unwanted contact with the optical disc.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIGS. 13A and 13B are views respectively explaining the operation of the optical pickup system via a skew correcting mechanism to cope with deformation of the optical disc according to the third embodiment of the present invention;

FIGS. 17A and 17B are views respectively explaining the operation at the time of inserting an optical disc or cartridge into the optical disc camcorder related to the third embodiment of the present invention;

DESCRIPTION OF THE PREFERRED EMBODIMENTS

Referring now to the accompanying drawings, practical form for embodying the present invention will be described below.

Figure 1:
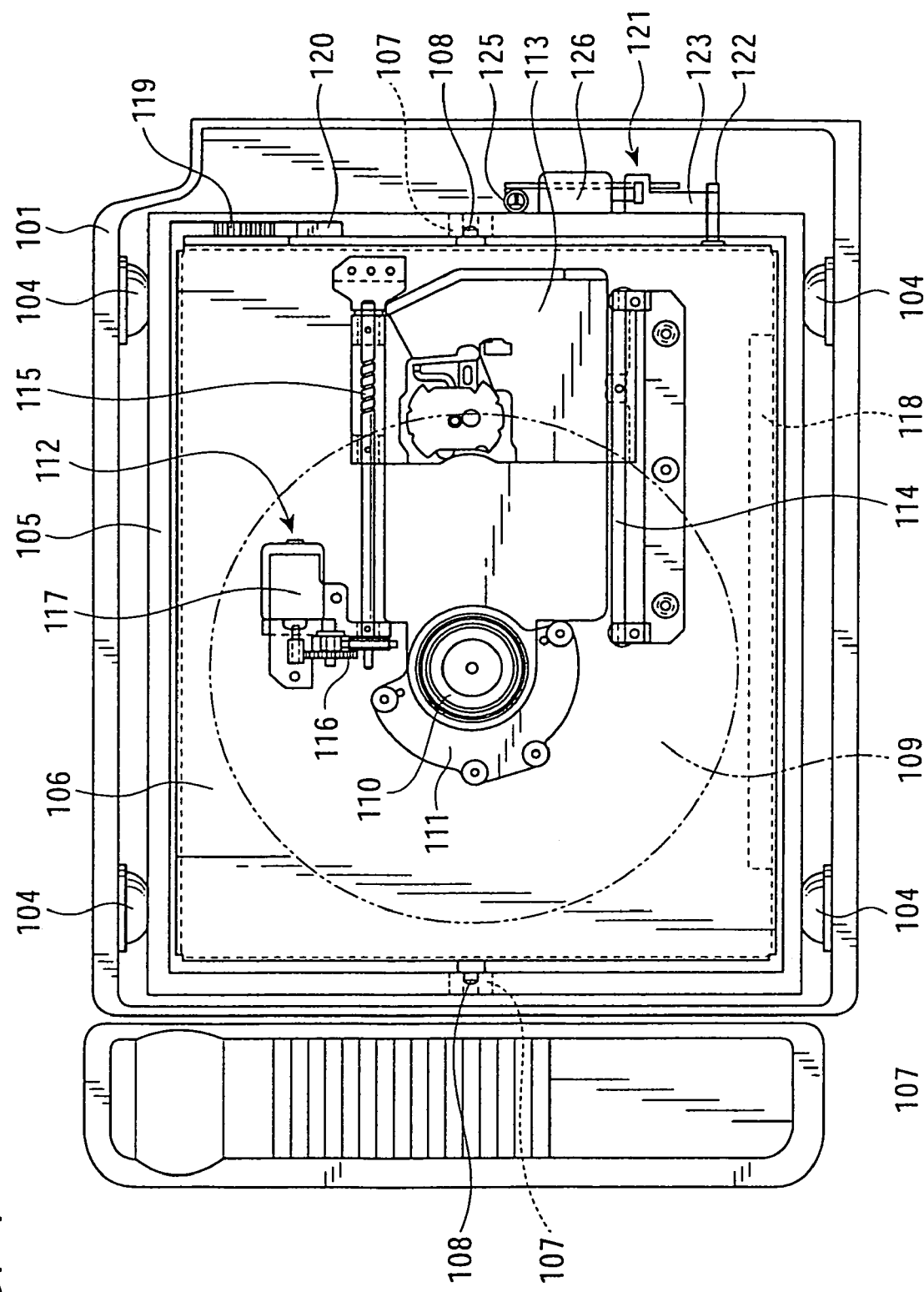
FIG. 1 is a lateral view of the essential components of an optical disc camcorder according to the first embodiment of the present invention.
Figure 2:
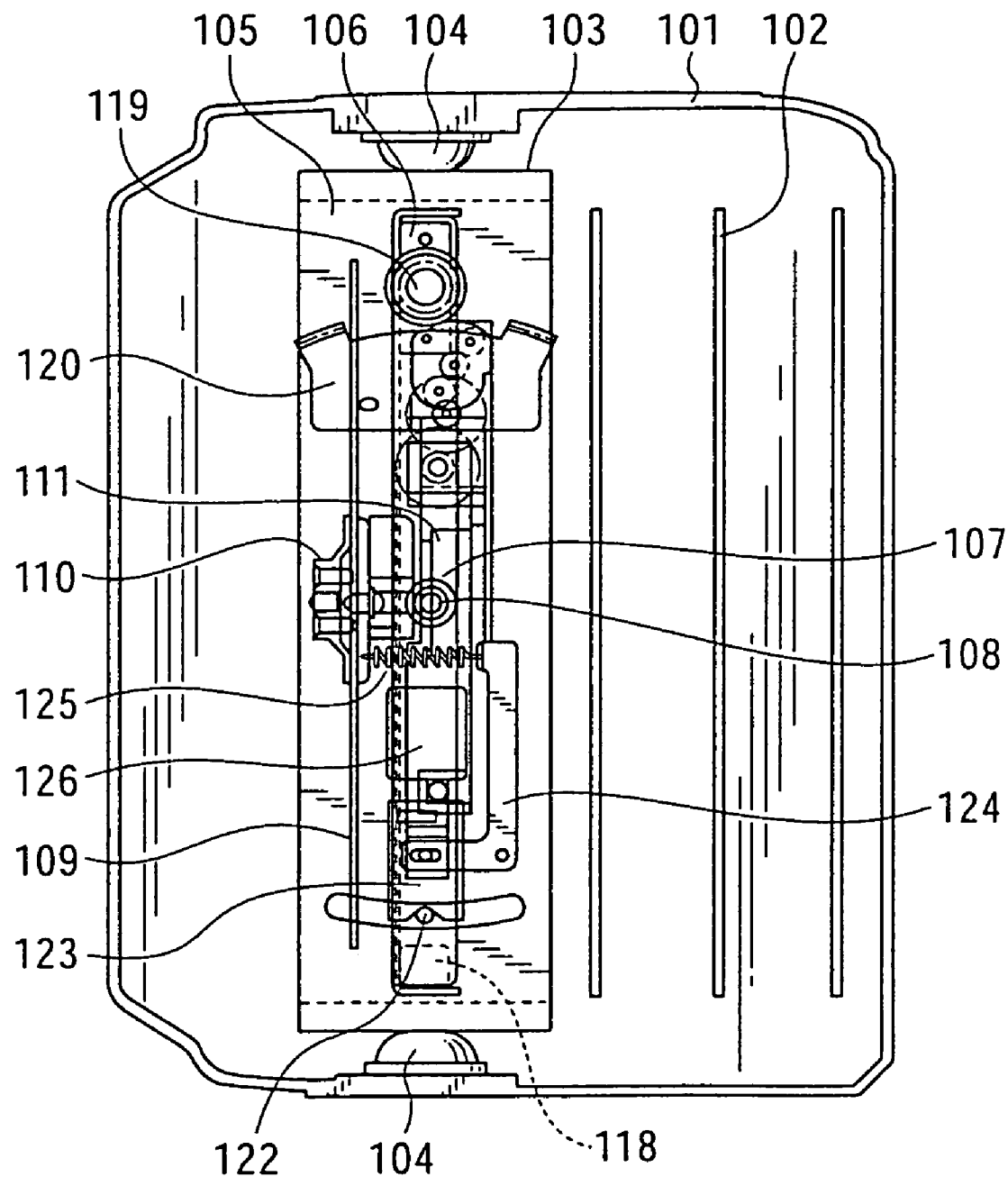
FIG. 2 is a front view of the essential components of the optical disc camcorder shown in FIG. 1.

FIG. 1 is a lateral view of a main body of the optical disc camcorder according to the first embodiment of the present invention. FIG. 2 is a front view of the optical disc camcorder shown in FIG. 1.

Generally, an optical disc camcorder main body (chassis) 101 internally comprises two parts including the one having an electrical printed wiring board 102 disposed thereon and the other one having an optical-disc drive unit 103 disposed thereon. The optical disc drive unit 103 is secured to the camcorder main body (chassis) 101 via a damper 104 which absorbs external oscillation and shock, where the damper 104 is secured to a sub-chassis 105. A pair of bearing units 107 are disposed on both sides of the sub-chassis 105 in the horizontal direction of the main body 101, whereby enabling a base plate assembly 106 to be rotated.

A pair of rotary shafts 108 supporting the base plate assembly 106 are respectively disposed on both sides of the base plate assembly 106 and inserted into the bearing units 107 disposed on both sides of the sub-chassis 105. The base plate assembly 106 itself consists of a conventional optical disc drive unit. The base plate assembly 106 is fitted with an optical pickup unit 113 for executing signal recording and reproduction against an optical disc 109 via a spindle motor 111 attached with a turn table 110 for fixedly rotating the optical disc 109 and also via a seek-forwarding mechanism 112. The optical pickup unit 113 performs seeking operation in the radial direction of the optical disc 109 under guidance of a seek-directional guide shaft 114 secured onto the base plate assembly 106 via operation of the seek-forwarding mechanism 112 comprising a lead screw 115, a gear array 116, and a seek-drive motor 117.

A weight 118 is secured to the base plate assembly 106 in order that center of the gravity of the entire base plate assembly 106 can be positioned lower than that of the above-referred rotary shaft 108. Thus, it is so arranged that, even when the camcorder main body 101 has been inclined, the base plate assembly 106 retains upright posture being perpendicular to the ground surface all the time. To cope with such a case in which the optical disc camcorder main body 101 is tilted beyond a predetermined angle and subsequently sizable angular deflection has been generated between the optical disc camcorder main body 101 and the base plate assembly 106, an oil gear damper 119 is secured to the base plate assembly 106 to function as stopper means.

It is so arranged that the oil gear damper 119 is brought into engagement with a stopper gear 120 secured to the sub-chassis 105 whenever angular deflection amount exceeds ±20 degrees between the optical disc camcorder main body 101 and the base plate assembly 106.

A rotation locking mechanism 121 is secured to the sub-chassis 105 to function as the locking mechanism of the base plate assembly 106 against the sub-chassis 105 in a case where power supply remains OFF from the optical disc camcorder main body 101 or in such a case in which activation of the rolling-mode restricting mechanism is not desired. It is so arranged that the rotation locking mechanism 121 locks a locking shaft 122 secured to the base plate assembly 106 via a locking block 123, a locking arm 124 and locking spring 125. The locked condition is released by operating a locking-release solenoid 126.

Figure 3A:
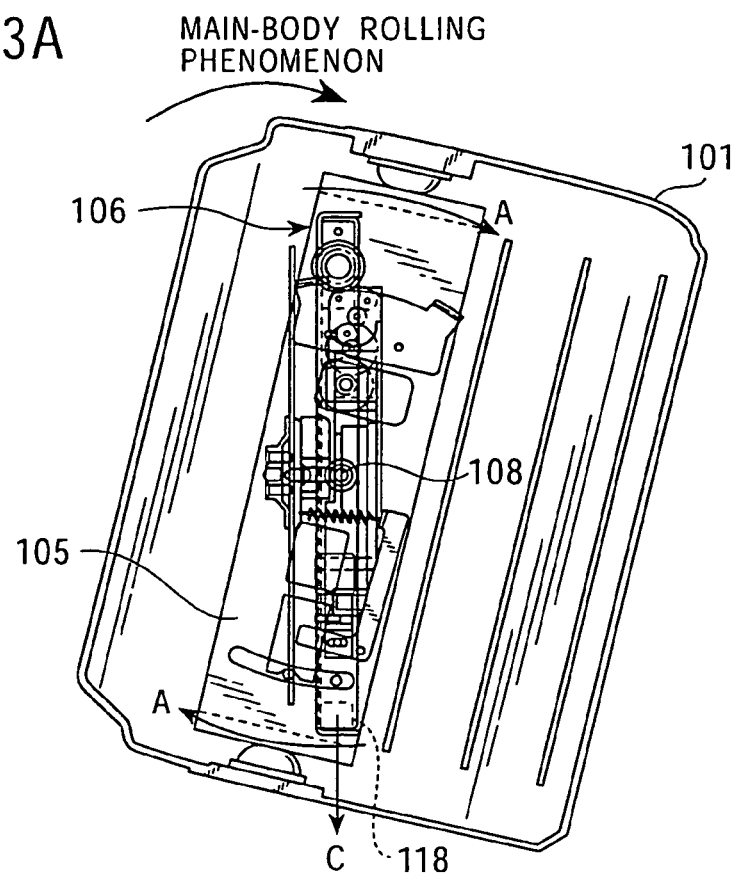
FIGS. 3A and 3B are views respectively explaining the self-erecting principle of a base plate assembly to cope with rolling phenomenon generated in an optical disc camcorder main body according to the first embodiment of the present invention.
Figure 3B:
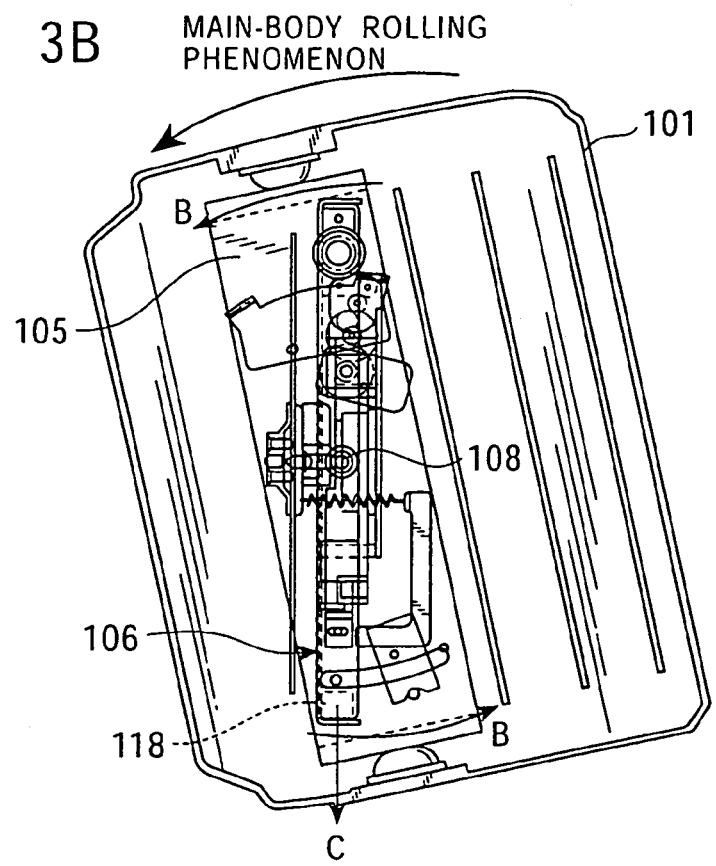

FIGS. 3A and 3B respectively designate the principle for enabling the base plate assembly 106 to constantly maintain own stationary posture being perpendicular to the ground surface even when rolling phenomenon is generated in the optical disc camcorder main body 101. FIG. 3A shows a state where the optical disc camcorder main body 101 is inclined in the direction A due to the rolling phenomenon of the optical disc camcorder main body 101, and FIG. 3B shows a state where it is inclined in the direction B.

As was described earlier, inasmuch as the weight 118 is disposed at a position immediately below the rotary shaft 108 of the base plate assembly 106 in order that the center of gravity constantly remains at a lower position than the rotary shaft 108, because of the lower-positioned center of the gravity, specific force is generated in the direction C.

Inasmuch as the base plate assembly 106 freely rotates itself in the periphery of the rotary shaft 108 with regard to the sub-chassis 105, whenever the camcorder main body 101 inclines itself in the direction A, the base plate assembly 106 inclines itself in the direction inverse from the direction A with regard to the sub-chassis 105, whereby enabling the base plate assembly 106 to always maintain own stationary posture being perpendicular to the ground surface, as shown in FIG. 3A. The same rule applies to a case in which the camcorder main body 101 inclines itself in the direction B being inverse from the direction A shown in FIG. 3B. Inasmuch as the rolling phenomenon is caused by continual generation of alternate tilting movement in the directions A and B, even when the rolling phenomenon is generated, because of the above-referred physical action, independent of the physical movement of the camcorder main body 101, the base plate assembly 106 can always preserve own stationary posture constant.

Disconnected transmission of the rolling phenomenon of the camcorder main body 101 to the built-in base plate assembly 106 means that the optical disc 109 is totally free from generation of gyro moment. Accordingly, the optical disc 109 is free from incurring unwanted force that otherwise causes the optical disc 109 to be deformed, whereby enabling the positional relationship between the optical pickup system 113 and the optical disc 109 to constantly remain in the optimal (SKEW=0) condition.

Actually, rolling phenomenon generated in the optical disc camcorder main body 101 is identified to be a maximum of 4 Hz within ±15 degrees of range. When considering practically usable level of picked up video image, in most cases, tilt of the camcorder main body 101 is identified to be within 0~5 degrees of range. However, when introducing such a specific structure designed for independently preserving constant posture solely based on the relationship between the position of the center of the gravity of the base plate assembly 106 and the position of the rotary axis as has been realized by the invention, it is quite necessary to consider the rotatable range, in other words, self-erect-sustainable range. To realize the object, the present invention provides the oil-gear-damper 119 being secured to the base plate assembly 106 and also the stopper gear 120 being secured to the sub-chassis 105 as practical means to stop rotation with regard to chassis of the base plate assembly 106.

Figure 4A:
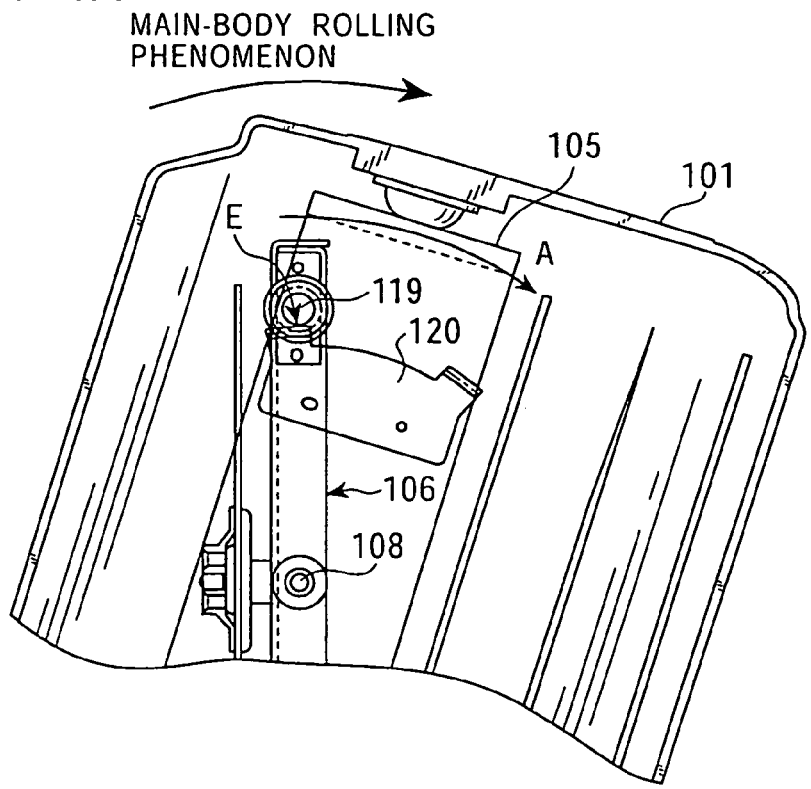
FIGS. 4A and 4B are views respectively explaining a stopper mechanism comprising an oil-gear damper according to the first embodiment of the present invention.
Figure 4B:
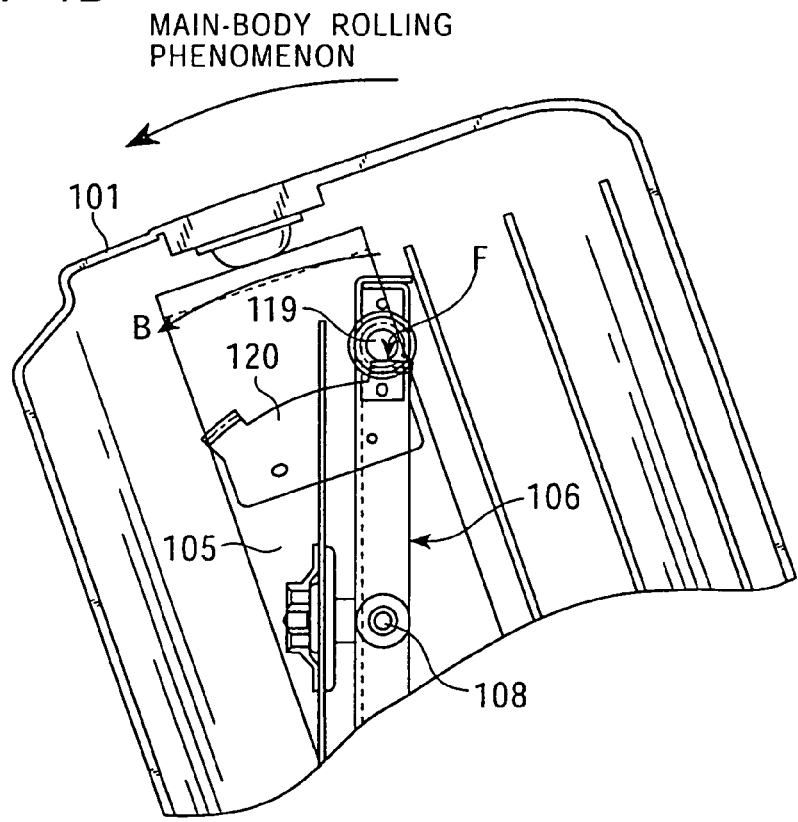

FIGS. 4A and 4B are views respectively explaining the operation of the stopper mechanism comprising the oil-gear-damper 119. FIG. 4A shows a state where the camcorder main body 101 is inclined in the direction due to the rolling phenomenon of the camcorder main body 101, and FIG. 4B shows a state where it is inclined in the direction B. As is shown in FIGS. 4A and 4B, when the camcorder main body 101 is inclined by more than ±20 degrees, in other words, when more than ±20 degrees of angular deflection has been generated between the sub-chassis 105 and the base plate assembly 106, the oil-gear-damper 119 is brought into engagement with the stopper gear 120 at the position E (shown in FIG. 4A) and the other position F (shown in FIG. 4B). Even when unexpected shock has been added to the camcorder main body 101, owing to buffering effect of the oil-gear-damper 119 filled with oil in the periphery of the rotary shaft 108, shock is fully absorbed to subsequently halt rotation of the base plate assembly 106 without incurring shock thereto. Actually, the range (within ±20 degrees) without causing the oil-gear-damper 119 to be engaged with the stopper gear 120 corresponds to such a specific range in which the base plate assembly 106 can independently maintain own stationary posture. The above-referred structural arrangement effectively functions as the rolling phenomenon-preventive mechanism in actual service.

Figure 5A:
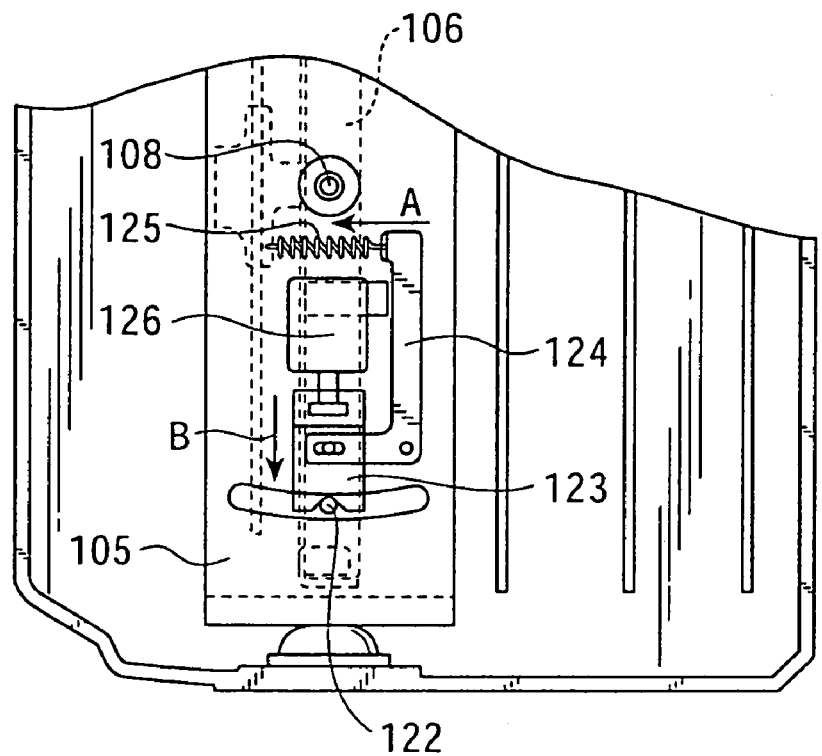
FIGS. 5A and 5B are views respectively explaining the operation of a rotation locking mechanism according to the first embodiment of the present invention.
Figure 5B:
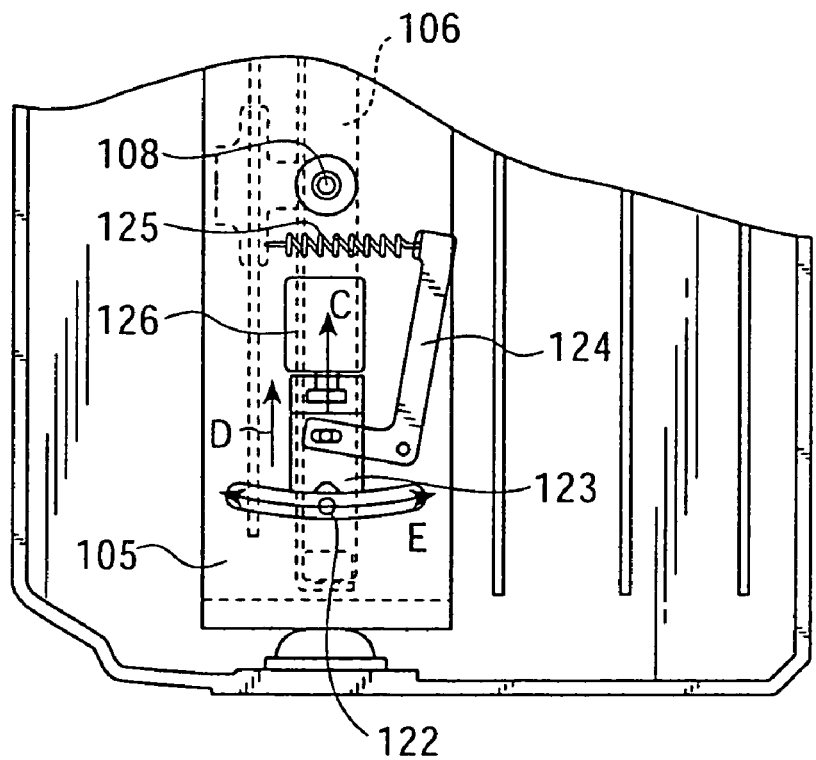

FIGS. 5A and 5B are respectively explanatory of the mechanism for locking rotation of the base plate assembly 106 with regard to the sub-chassis 105. When the base plate assembly 106 freely rotates itself with regard to the rotary shaft 108 while power is turned OFF from the camcorder main body 101, because of shock being added on the way of carrying the camcorder main body 101, the base plate assembly 106 may incur unwanted damage. While inserting or ejecting an optical disc (cartridge) 109 into or out from the camcorder main body 101, handling convenience is much better when the base plate assembly 106 is fixed to the sub-chassis 105. The rotation locking mechanism 121 locks the rotation of the base plate assembly 106 with regard to the sub-chassis 105. In a case of locking the rotation of the base plate assembly 106 (refer to FIG. 5A), resilient force energized by locking spring 125 is transmitted in the direction A to cause the locking block 123 to be shifted in the direction B via the locking arm 124. This in turn causes the locking shaft 122 provided for the base plate assembly 106 to be fixed, whereby locking the rotation of the base plate assembly 106. Conversely, in a case of unlocking the rotation of the base plate assembly 106 (refer to FIG. 5B), resilient force energized by solenoid 126 is transmitted in the direction C to cause the locking block 123 to be shifted in the direction D, whereby freeing the locking shaft 123 to enable the base plate assembly 106 to be rotated in the direction E.

As has thus been described in regard to the first embodiment of the present invention, according to the presents invention, even when rolling phenomenon is generated inside of the optical disc camcorder body, by way of causing the base plate assembly to independently rotate itself inside of the camcorder body via the relationship between the position of the center of the gravity and the rotary shaft, the rolling phenomenon is not transmitted to inside of the main body and the optical disc remains totally being free from gyro moment internally being generated.

Figure 6:
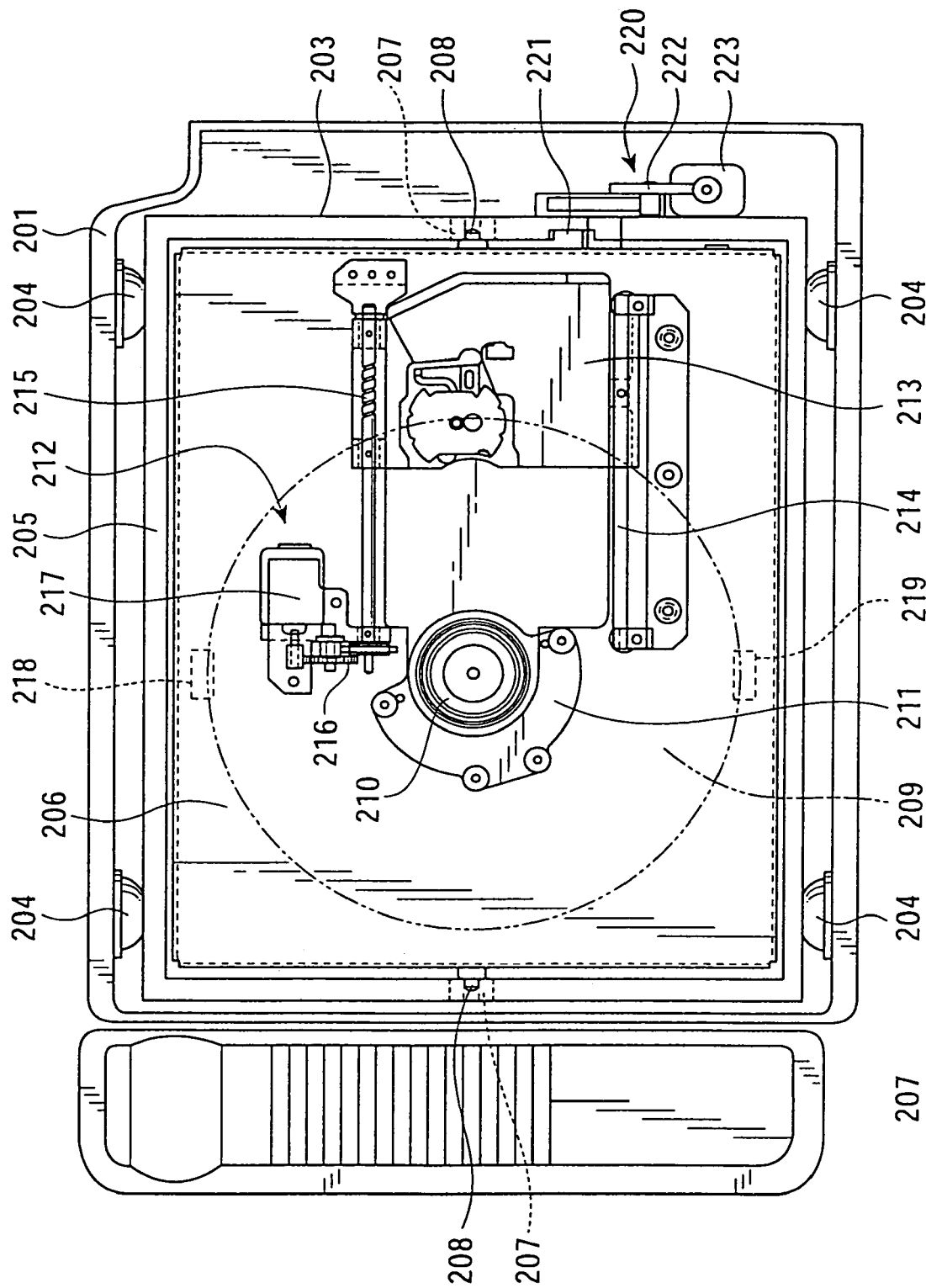
FIG. 6 is a lateral view of the essential components of the optical disc camcorder according to the second embodiment of the present invention.
Figure 7:
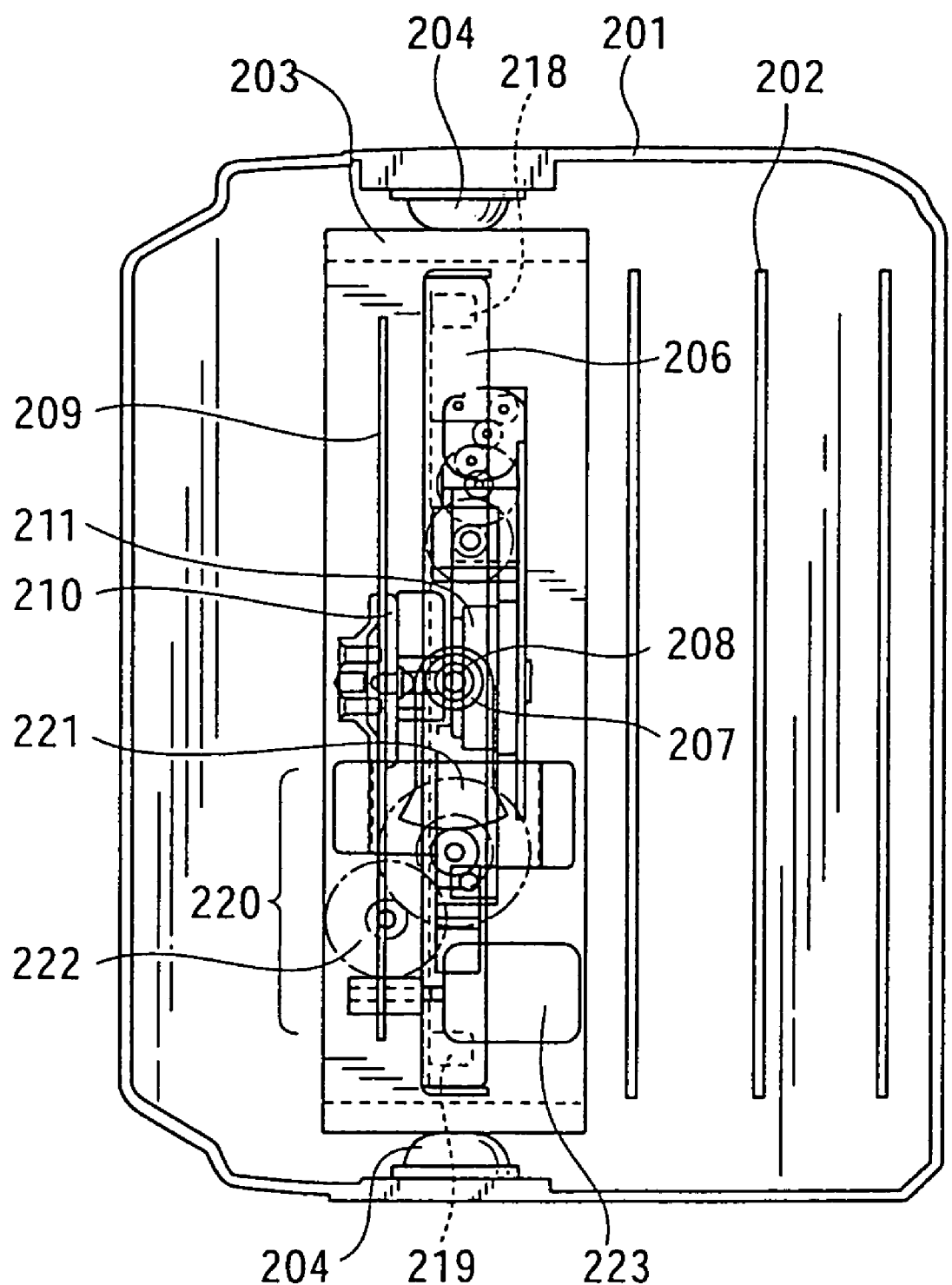
FIG. 7 is a front view of the essential components of the optical disc camcorder shown in FIG. 6.

FIG. 6 is a lateral view of structural components of the optical disc camcorder according to the second embodiment of the present invention. FIG. 7 is a front view of the optical disc camcorder shown in FIG. 6.

Generally, the interior of an optical disc camcorder 201 comprises two parts including the one having an electrical printed wiring board 202 disposed thereon and the other one having an optical disc drive unit 203 disposed thereon. The optical disc drive unit 203 is secured to a chassis 201 via a damper 204 which absorbs oscillation and shock from external source. Actually, the damper 204 is secured to a sub-chassis 205 whose both-side portions respectively have a bearing unit 207 enabling the base plate assembly 206 to be rotated in the horizontal direction of the main body 201. A pair of rotary shafts 208 disposed on both sides of the base plate assembly 206 respectively are accommodated in the bearings 207 disposed on both sides of the sub-chassis 205. Actually, the base plate assembly 206 consists of a conventional optical disc drive unit, which comprises a spindle motor 211 attached with a turn table 210 for fixedly rotating the optical disc 209 and an optical image pickup system 213 for recording and reproducing signal onto and from the optical disc 209 via seek-forwarding mechanism 212. Under the guidance of a guide shaft 214 secured onto the base plate assembly 206, the optical pickup system 213 performs seek operation in the radial direction of the optical disc 209 via the seek-forwarding mechanism 212 comprising a lead screw 215, a gear array 216 and a seek-drive motor 217.

The base plate assembly 206 is fitted with an upper angular-speed (i.e., acceleration degree) sensor 218 being disposed above the rotary shaft 208 at a specific position extended from the spindle motor 211 and a lower angular-speed (i.e., acceleration degree) sensor 219 disposed below the rotary shaft 208. The upper and lower sensors 218 and 219 respectively measure angular speed (acceleration degree) of the base plate assembly 206 generated in the periphery of the rotary shaft 208. The sub-chassis 205 is fitted with a rolling-cancel mechanism 220. A stationary gear 221 secured to the base plate assembly 206 is driven by a gear array 222 comprising a flat gear, a worm gear, and a worm wheel via a drive motor 223.

Figure 8A:
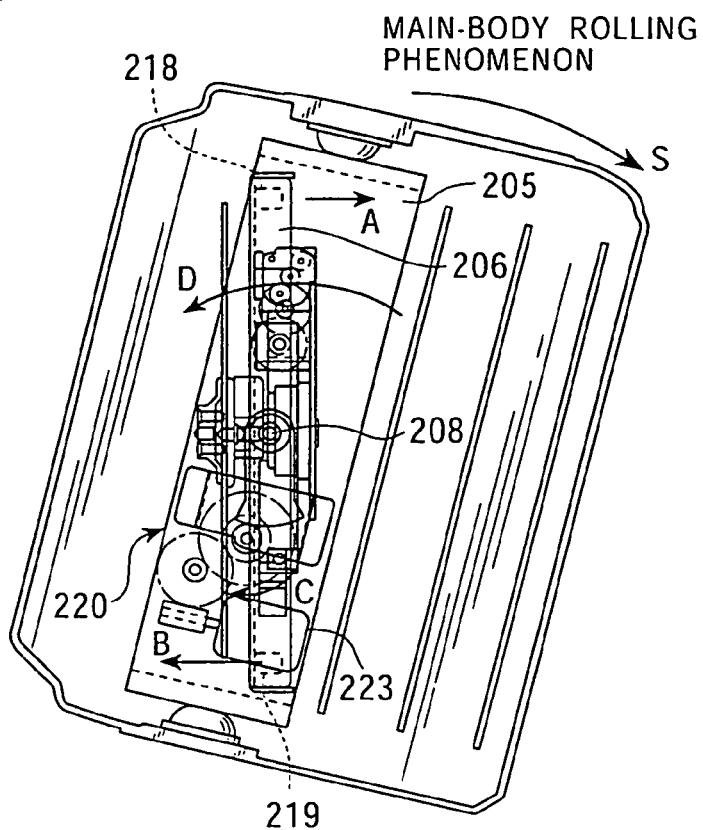
FIGS. 8A and 8B are views respectively explaining the operation of a cancel mechanism to cope with rolling phenomenon generated in the optical disc camcorder according to the second embodiment of the present invention.
Figure 8B:
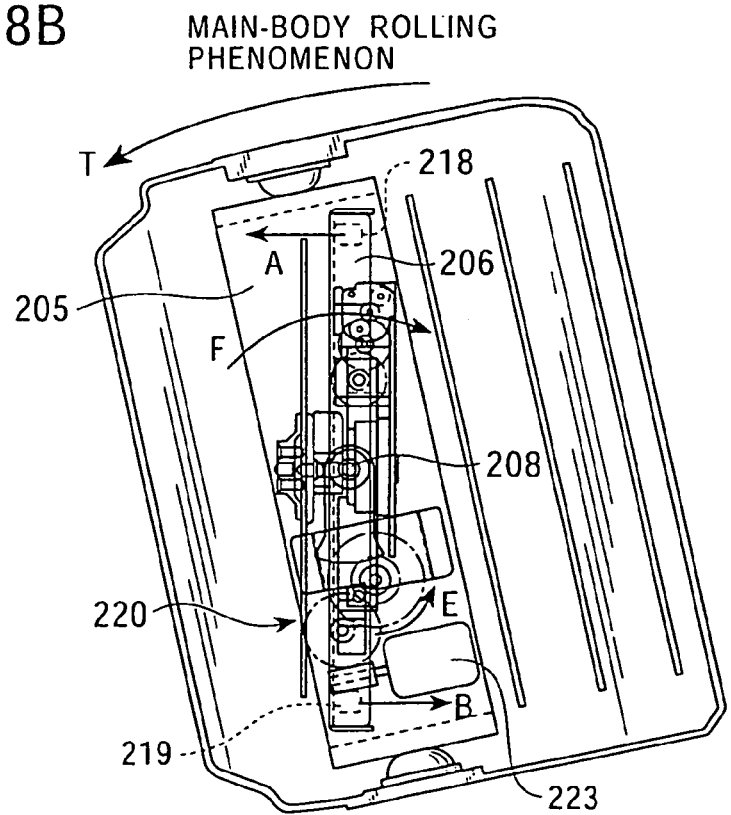

FIGS. 8A and 8B are views respectively explaining the operation of the above-referred rolling-mode cancel mechanism 220. FIG. 8A designates a state in which the optical disc camcorder main body 201 is inclined in the direction S. In such a condition in which the base plate assembly 206 is secured to the sub-chassis 208 without being provided with the rolling-mode cancel mechanism 220, the angular speed sensors 218 and 219 secured to the base plate assembly 206 jointly measure the angular speed in the direction A at the upper portion of the rotary shaft 208 and the angular speed in the direction B at the lower portion of the rotary shaft 208. When the drive gear array 222 rotates in the direction C, the rolling-mode cancel mechanism 220 causes the base plate assembly 206 to be rotated in the direction D with regard to the sub-chassis 208 by pivoting on the rotary shaft 208 to enable the base plate assembly 206 to hold on stationary posture being vertical to the ground surface all the time.

FIG. 8B designates a case in which the optical disc camcorder 201 is inclined in the direction T being inverse from the direction S shown in FIG. 8A. Rolling mode designates such a phenomenon in which the tilt in the directions S and T alternately occurs in succession. However, owing to the above-referred mechanical arrangement, even when the optical disc camcorder main body 201 inclines, the base plate assembly 206 maintains constant (vertical) posture all the time. In order to enable the base plate assembly 206 to always maintain vertical posture, the rolling-mode cancel mechanism 220 controls posture of the base plate assembly 206 so that the angular-speed sensors 218 and 219 does not measure actual angular speed all the time, in other words, in order that the angular-speed sensors 218 and 219 will constantly indicate value 0.

Figure 9A:
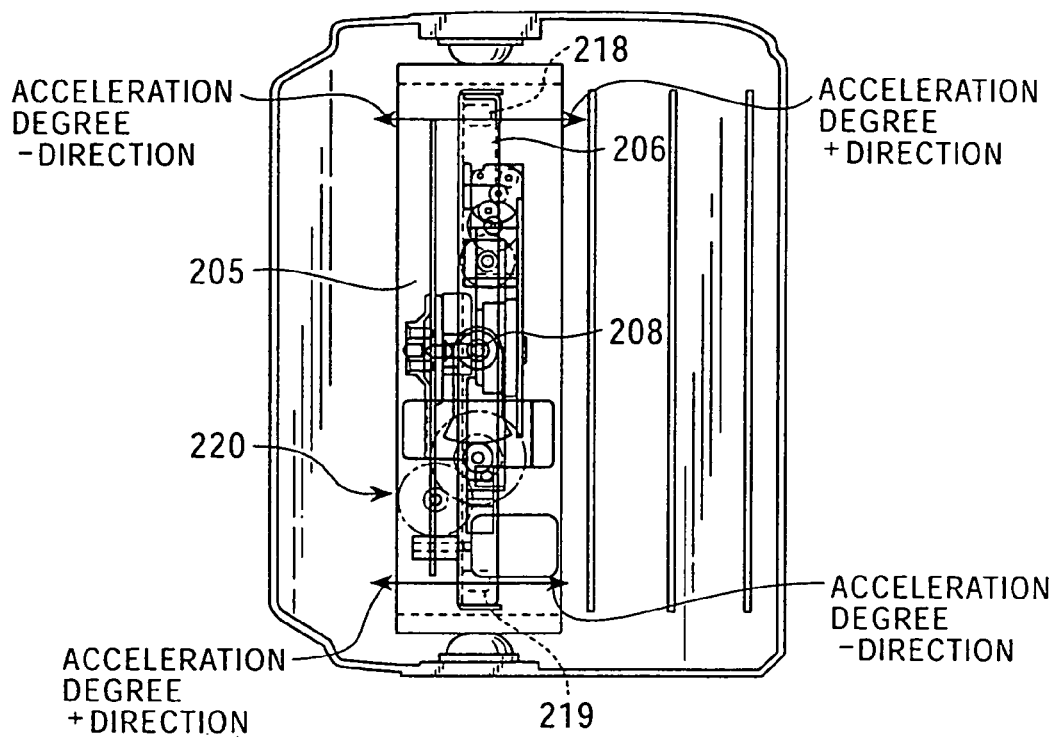
FIGS. 9A and 9B are views respectively explaining the positive and negative directions and measurable values in occurrence of rolling via upper and lower sensors for detecting upper and lower angular speed according to the second embodiment of the present invention.
Figure 9B:
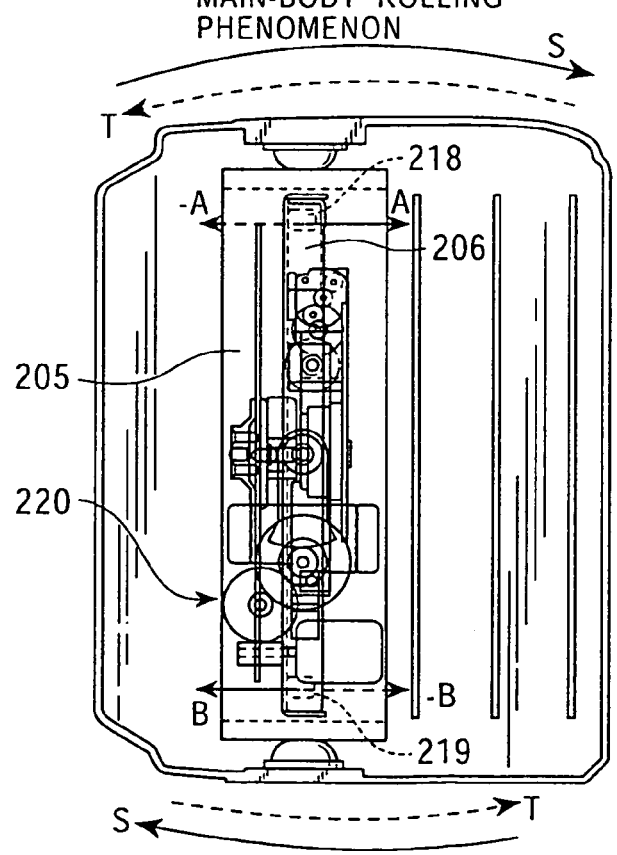

FIGS. 9A and 9B respectively designate definition of the direction of angular speed being detected by the above-referred upper and lower angular-speed sensors 218 and 219 and the definition of the positive and negative codes shown therein. As is shown in FIG. 9A, it is defined that the direction + corresponds to the direction in which the base plate assembly 206 rotates in the clockwise direction with regard to the rotary shaft 208. As is shown in FIG. 9B, whenever the S-directional rolling (tilt) is generated in the optical disc camcorder main body 201, the upper sensor 218 measures angular speed of the base plate assembly 206 in the direction A, whereas the lower sensor 219 measures angular-speed of the same in the direction B. Conversely, whenever the T-directional rolling (tilt) is generated in the optical disc camcorder body 201, the upper sensor 218 measures the angular-speed of the base plate assembly 206 in the direction –A, whereas the lower sensor 219 measures the angular-speed of the same in the direction –B. In other words, whenever the rolling phenomenon occurs in the optical disc camcorder main body 201, the upper and lower angular-speed sensors 218 and 219 jointly measures the angular-speed value based on the identical code.

Figure 10:
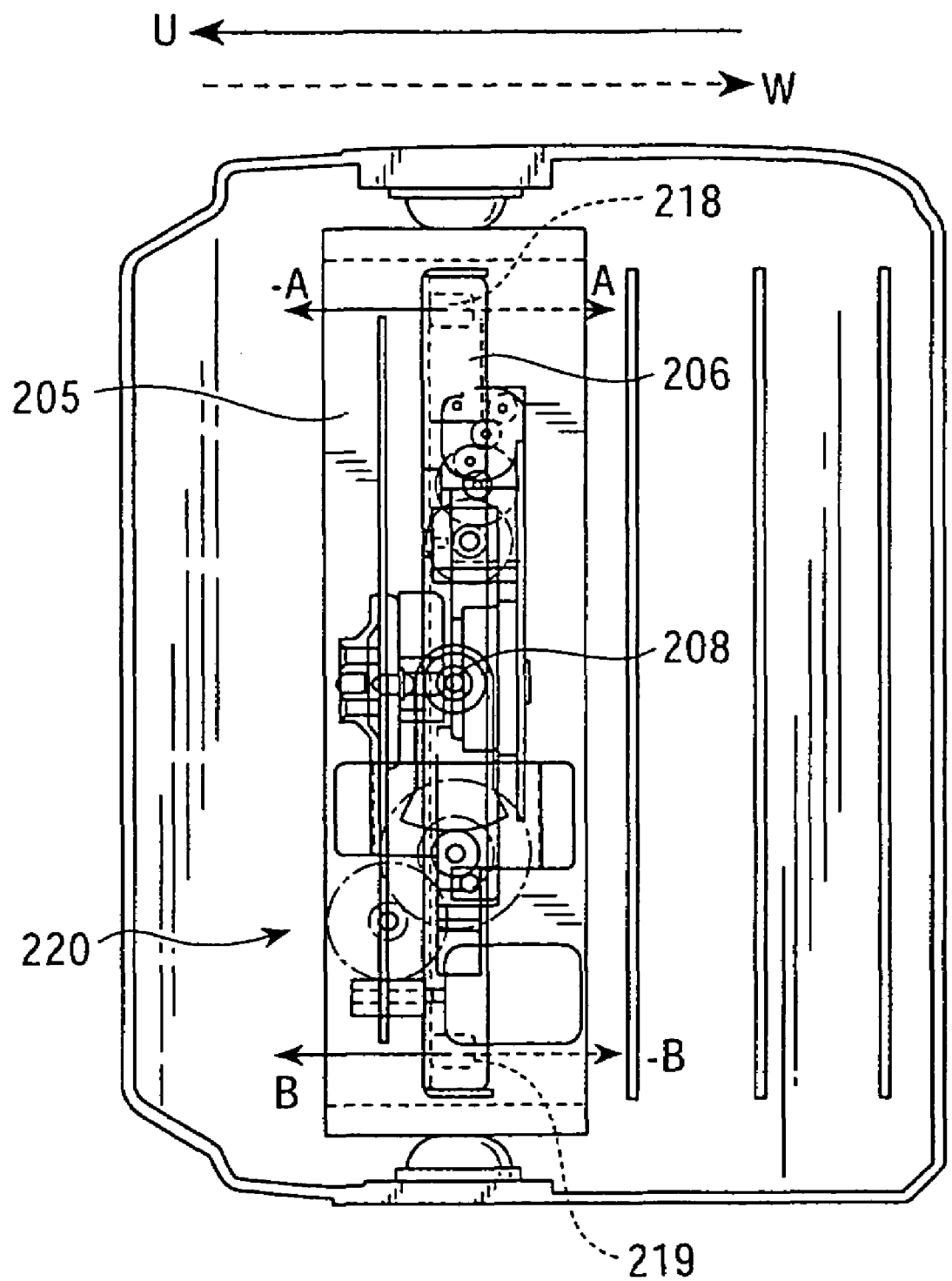
FIG. 10 is an explanatory view of a sensor output condition via horizontal shifting movement according to the second embodiment of the present invention.

On the other hand, FIG. 10 designates the horizontal movement of the optical disc camcorder main body 201 without requiring posture control in contrast to the above-referred rolling mode requiring posture control. In the figure, the reference codes "U" and "W" show the movement of the main body in a horizontal direction. In this case, unlike the above-referred rolling cancel operation, measured values of the upper and lower angular-speed sensors 218 and 219 are respectively designated by the positive and negative codes being inverse from each other. When this condition is present, the rolling-mode cancel mechanism 220 does not perform control of posture of the base plate assembly 206.

As has thus been described above, according to the practical form of the present invention, solely in the case in which rolling is generated in the optical disc camcorder main body 201, based on the positive or negative code of the values measured by a pair of the upper and lower angular-speed sensors 218 and 219 secured onto the base plate assembly 206, by causing the base plate assembly 206 to be rotated in the periphery of the rotary shaft 208, the rolling-mode cancel mechanism 220 enables the posture of the base plate assembly 206 to be held on constantly being vertical to the ground surface by arranging that the above-referred acceleration sensors 218 and 219 will be able to constantly output value 0. Because of this, even when rolling phenomenon is generated in the optical disc camcorder main body 201, posture of the base plate assembly 206 (the optical disc drive unit) is properly controlled in the direction to cancel rolling phenomenon. This in turn fully prevents the optical disc from internally generating gyro moment, and thus, the optical disc is free from incurring unwanted deformation and skew otherwise being generated between the optical axis of the object lens and the optical disc surface.

Figure 11:
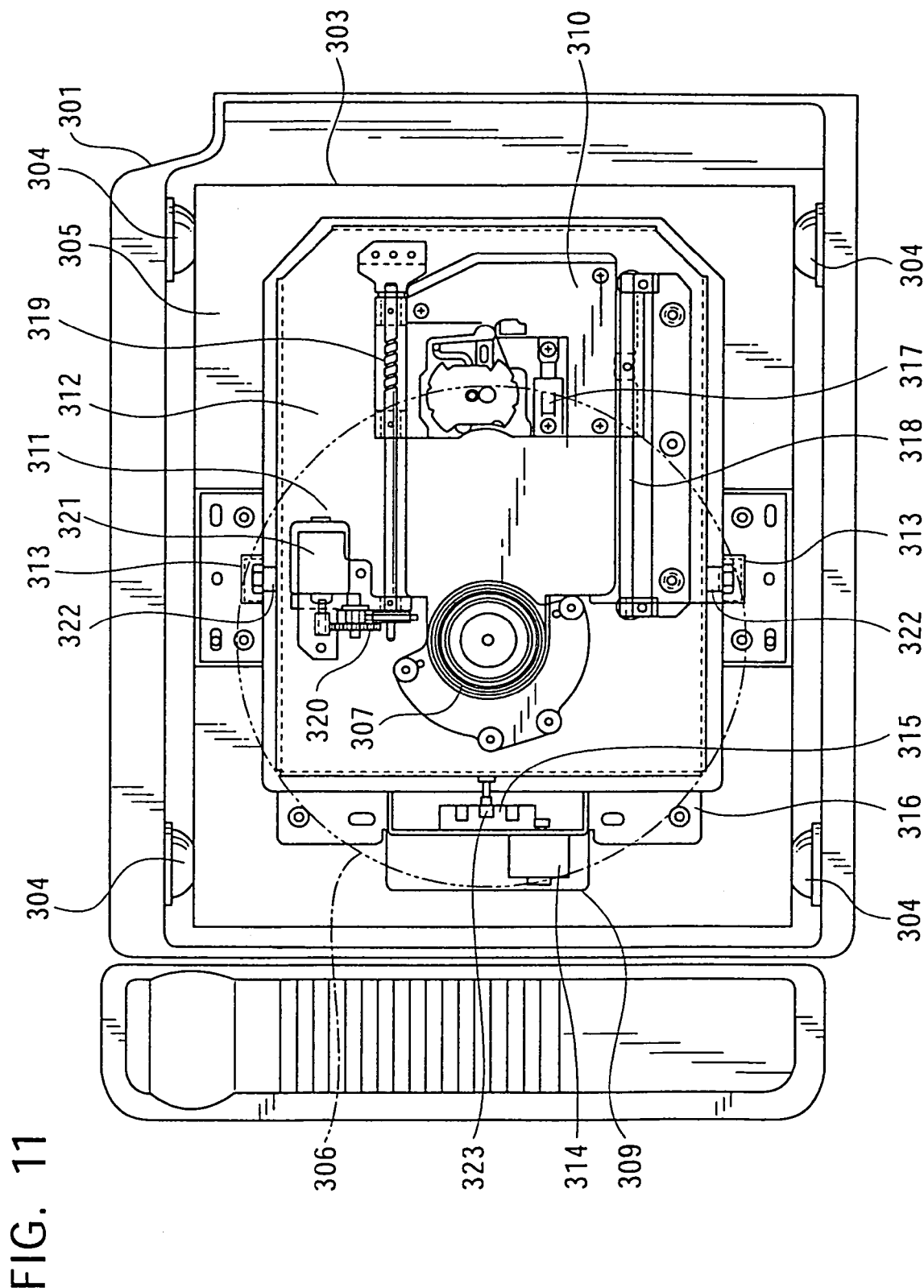
FIG. 11 is a lateral view of the essential components of the optical disc camcorder according to the third embodiment of the present invention.
Figure 12:
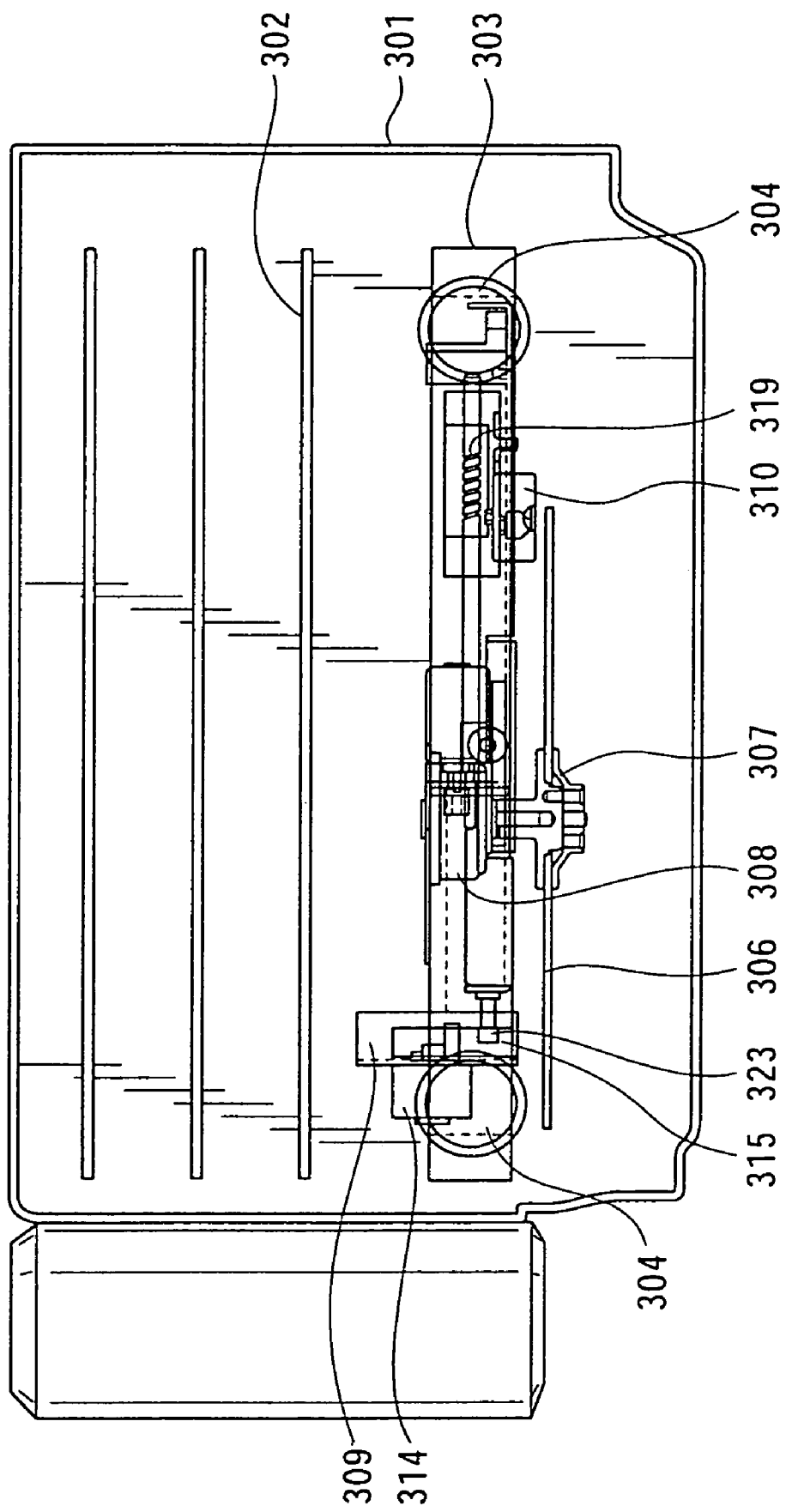
FIG. 12 is a top view of the essential component on the upper side of the optical disc camcorder shown in FIG. 11.

FIG. 11 is a lateral view of the main body of the optical disc camcorder according to the third embodiment of the present invention. FIG. 12 is a plan view showing the top view of the inventive optical disc camcorder shown in FIG. 11.

Generally, the interior of the optical disc camcorder main body 301 consists of two parts including the one having an electrical substrate 302 disposed thereon and the other one having the optical disc drive unit 303 disposed thereon. The optical disc drive unit 303 is secured to a chassis 301 via a damper 304 which absorbs oscillation and shock from external source. A base plate 305 to which the damper 304 is secured is disposed with a spindle motor 308 attached with a turn table 307 which fixedly rotates an optical disc 306; an active SKEW correcting mechanism 309 according to the present invention; an optical pickup system 310, a seek mechanism 311 which causes the optical pickup system 310 to perform seek operation in the radial direction of the optical disc 306; and a sub-base rotation shaft bearing 313 which makes up the rotary shaft of a sub-base assembly 312 mounting the seek mechanism 311.

The active SKEW correcting mechanism 309 comprises a drive motor 314, a cam gear unit 315 having an inner surface being formed into cam shape for driving the sub-base 312 and a holding substrate 316 which secures the cam gear unit 315 onto the base plate 305. The optical pickup system 310 is mounted with an LED-reflective type SKEW sensor 317 for measuring the amount of skew generated between the optical axis of the object lens and the optical-disc surface. In accordance with the guidance of a guide shaft 318 disposed on the sub-base 312, the optical pickup system 310 performs seek operation via the seek mechanism 311 consisting of a lead screw 319, a gear array 320, and a seek-drive motor 321. A sub-base rotary axial shaft 322 functioning as the axis for correcting skew is secured to the sub-base 312 in the vertical direction. Further, a skew drive shaft 323 making up operating origin in the course of correcting skew is engaged with the cam gear 315. Based on the above mechanical arrangement, by way of pivoting on the sub-base rotation shaft bearing 313 provided on the base plate 305, angular control for correcting the skew is executed by the active SKEW correcting mechanism 309.

Figure 23A:
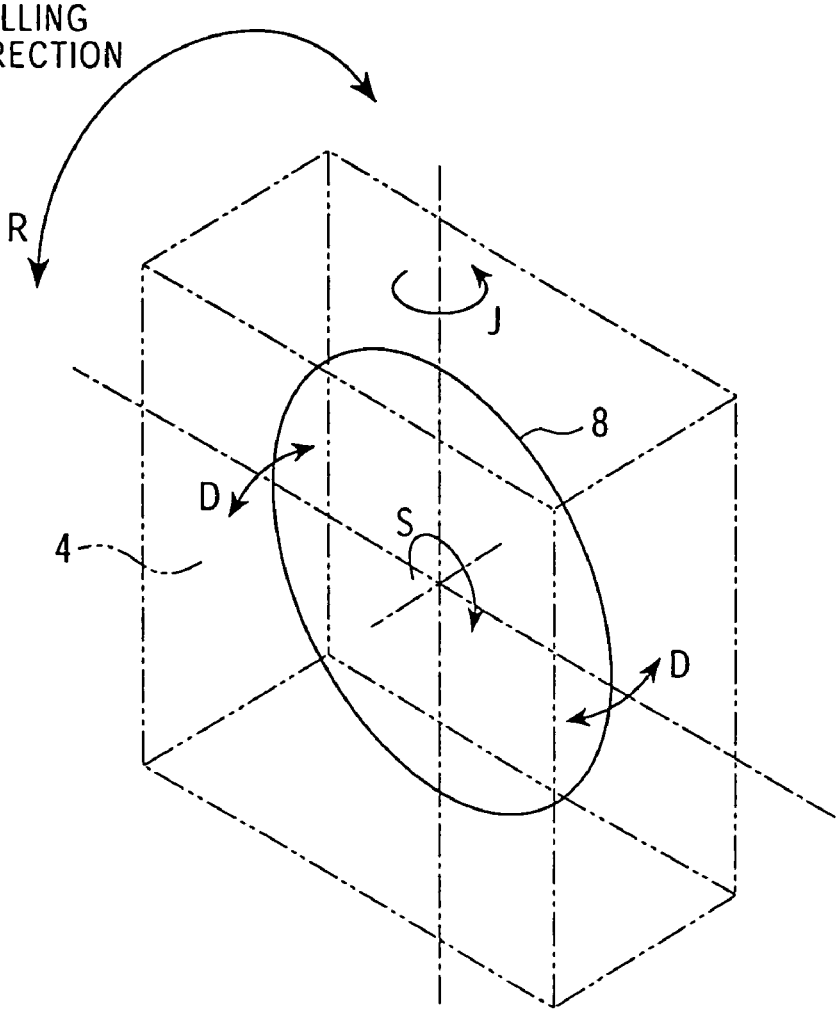
FIGS. 23A and 23B are views respectively explaining gyro moment generated by the rolling phenomenon in the camcorder main body and an example of deformed optical disc.
Figure 23B:
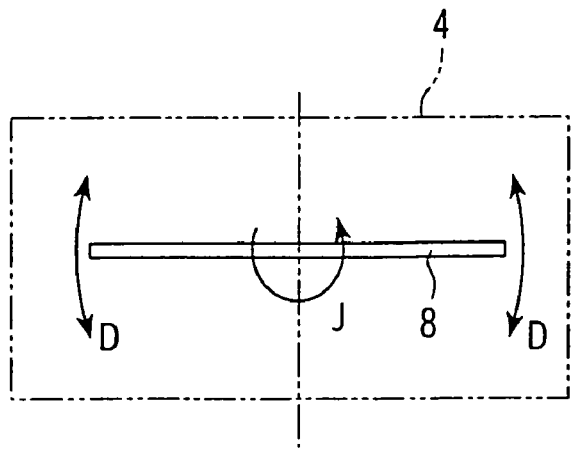

FIGS. 13A and 13B are views respectively explaining the operation of the active SKEW correcting mechanism 309. Once rolling phenomenon is generated in the optical disc camcorder main body, as shown in FIG. 23, gyro moment acts on the rotating optical disc to cause deformation of the disc. To prevent the rotating optical disc from incurring unwanted deformation, the active SKEW correcting mechanism 309 pertaining to the invention controls the amount of skew generated between the optical axis of the object lens and the optical disc surface so that it will remain being zero all the time.

FIG. 13A designates such a case in which the optical disc 306 is deformed in the direction P being apart from the optical pickup system 310. In this case, the active SKEW correcting mechanism 309 drives the optical pickup system 310 in the direction E being closer to the optical disc 306. Conversely, FIG. 13B designates such a case in which the optical disc 306 is deformed in the direction Q being closer to the optical pickup system 310. In this case, the active SKEW correcting mechanism 309 drives the optical pickup system 310 in the direction F being apart from the optical disc 306.

Figure 14:
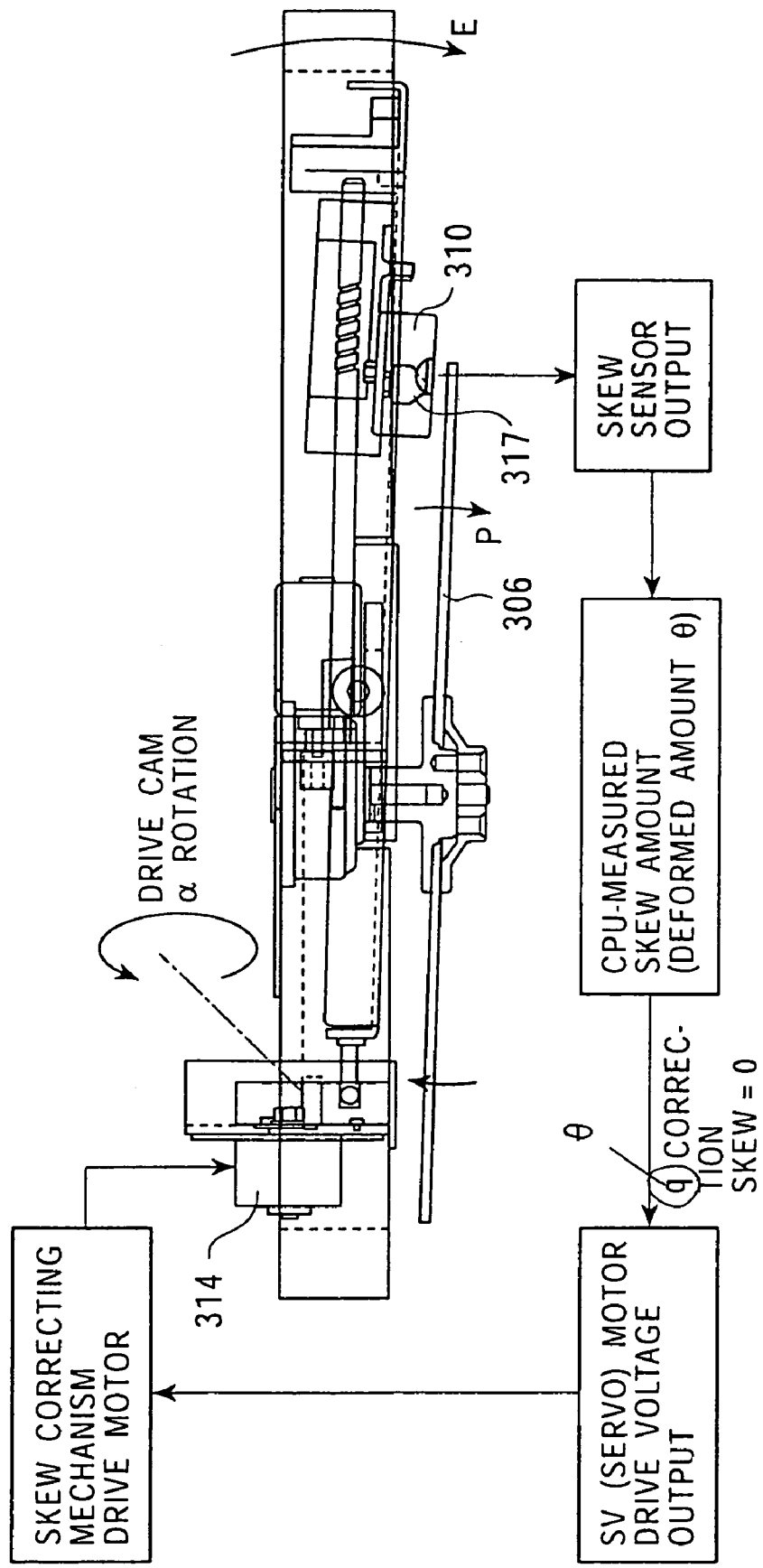
FIG. 14 is a block diagram of the control system related to the skew correcting mechanism according to the third embodiment of the present invention.

Generally, magnitude of rolling phenomenon generated in the optical disc camcorder ranges from 2 Hz to a maximum of 4 Hz, where the optical disc is subject to deformation based on the identical period. To cope with this, it is essential that skew be prevented from occurrence on the real-time basis so that SKEW=0 state will remain constant. FIG. 14 is a simplified block diagram being explanatory of the method of controlling drive operation of the SKEW correcting mechanism 309.

Amount of skew generated between the optical pickup system 310 and the surface of the optical disc 306 is measured by the skew sensor 317 secured to a position close to the object lens of the optical pickup system 310. A built-in CPU computes magnitude of signal output from the skew sensor 317 as the actual value of skew being generated.

Based on the computed skew amount, the CPU then delivers a specific amount of signal to the SKEW correcting drive motor 314 in order to fully offset the skew phenomenon (SKEW=0). Because of this, even when deformation amount θ is generated as a result of the deformation of the optical disc 306 in the arrow direction P subsequent to generation of rolling phenomenon in the optical disc camcorder main body, the deformation amount θ is corrected by way of driving the optical pickup system 310 in the arrow direction E via servo control of the voltage output from the skew correcting drive motor 314, thus making it possible to constantly preserve actual angle of the optical pickup system 310 relative to the optical disc 306 to be SKEW=0.

Figure 15:
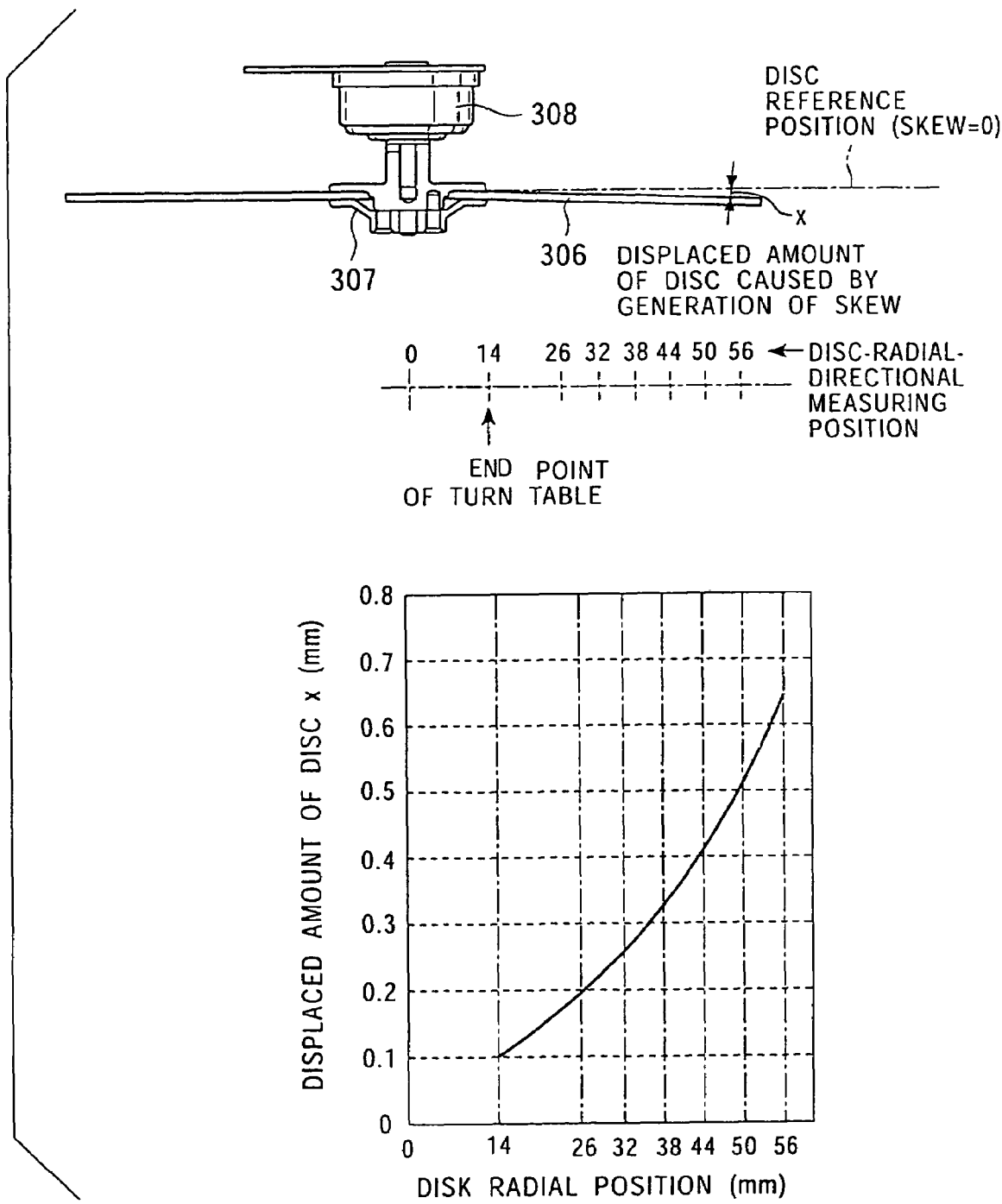
FIG. 15 is an explanatory view of a result of measuring displaced amount of the optical disc via an experiment utilizing an actual unit related to the third embodiment of the present invention.

It is one of the features of the practical form for embodying the present invention that the rotary axial position of the SKEW correcting mechanism 309 is set to an end point of the turn table 307. FIG. 15 designates the actual result of the measurement of the displaced amount of the optical disc 306 subsequent to generation of the rolling phenomenon corresponding to approximately 4 Hz/15 degrees in the actually operable optical disc camcorder main body. In accordance with the test result, it was identified that the deformation of the optical disc 306 generated by gyro moment resulted in the monotonous displacement of the optical disc 306 by about 0.8 degree in the radial direction from the end point of the turn table 307, to which the optical disc 306 is secured, as a fulcrum.

Figure 16A:
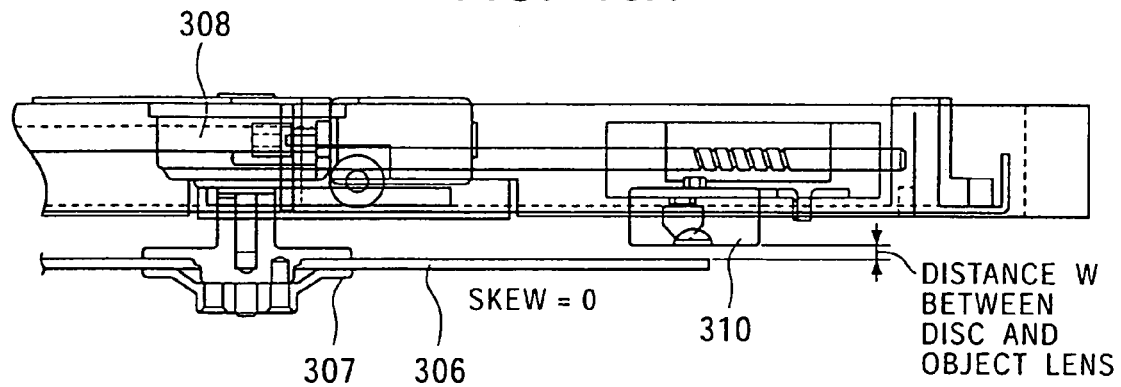
FIGS. 16A through 16C are views respectively explaining variation caused by the difference in a rotary pivotal position of the skew correcting mechanism related to the third embodiment of the present invention.
Figure 16B:
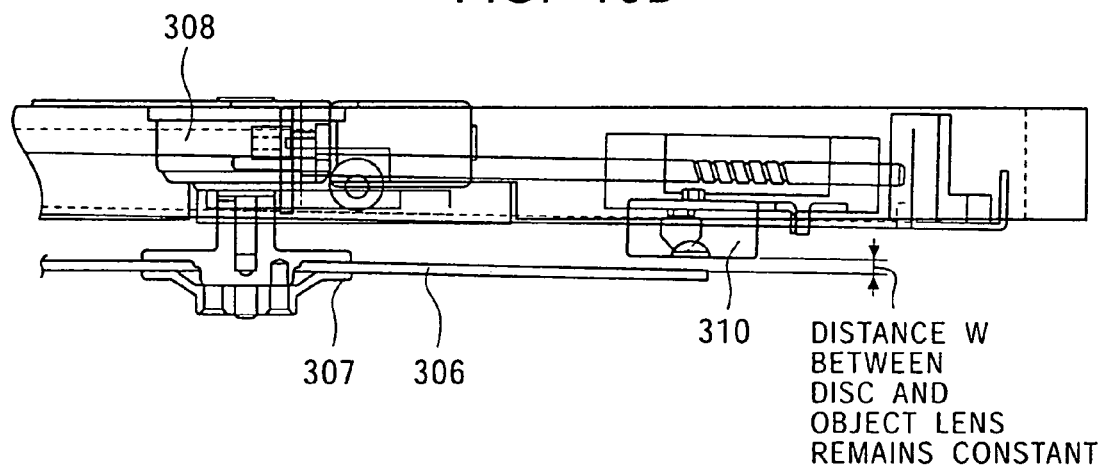
Figure 16C:
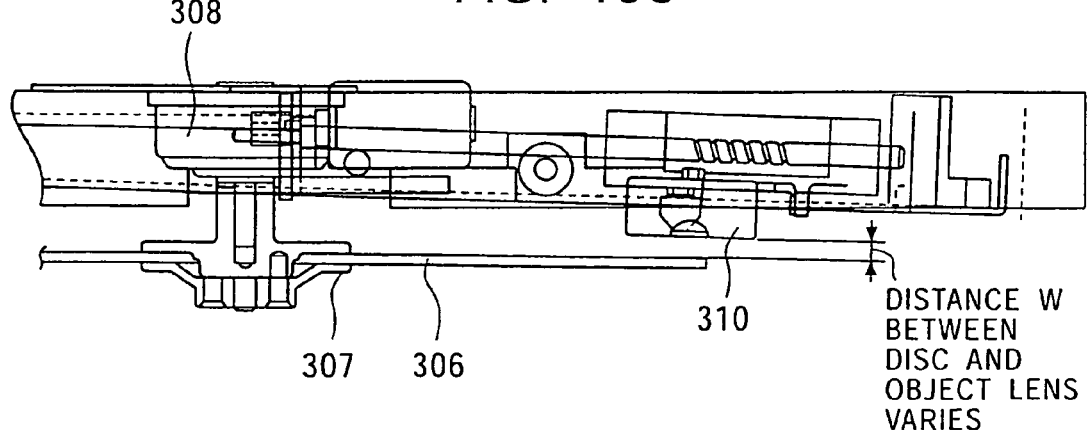
Figure 18A:
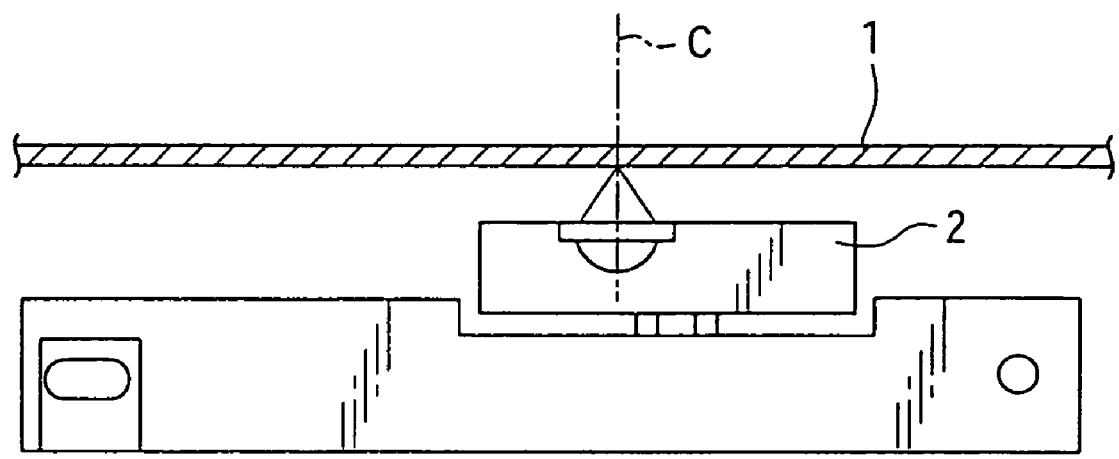
FIGS. 18A and 18B are views respectively explaining the state with and without occurrence of skew phenomenon.
Figure 18B:
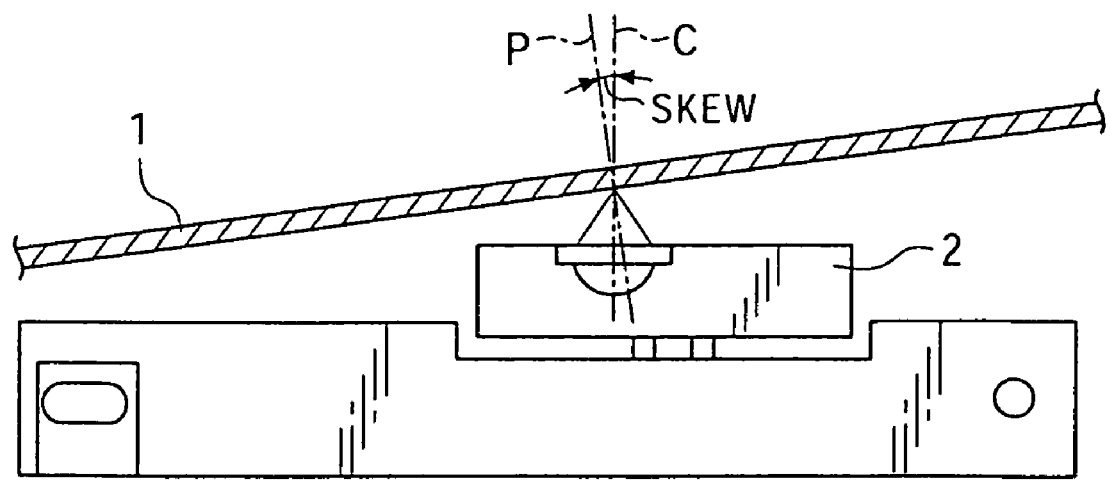
Figure 19A:
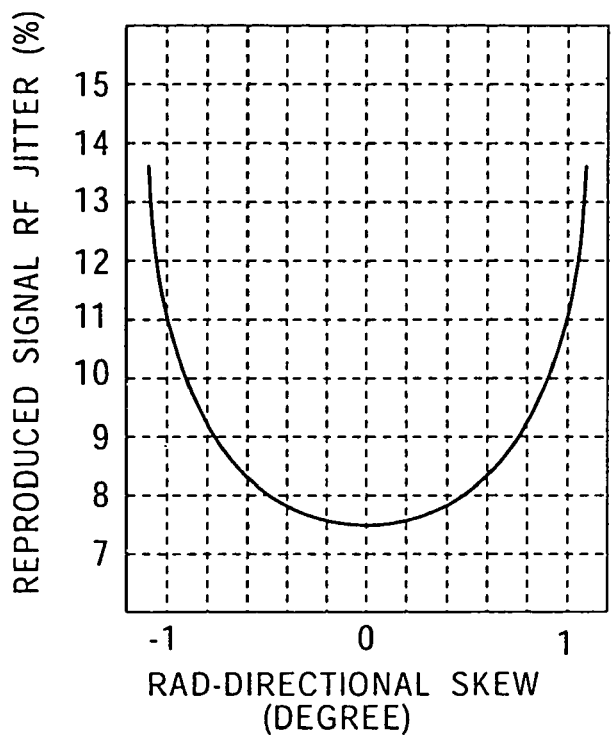
FIGS. 19A and 19B are graphic charts respectively showing growth of RF jitter components relative to variation of the skew phenomenon.
Figure 19B:
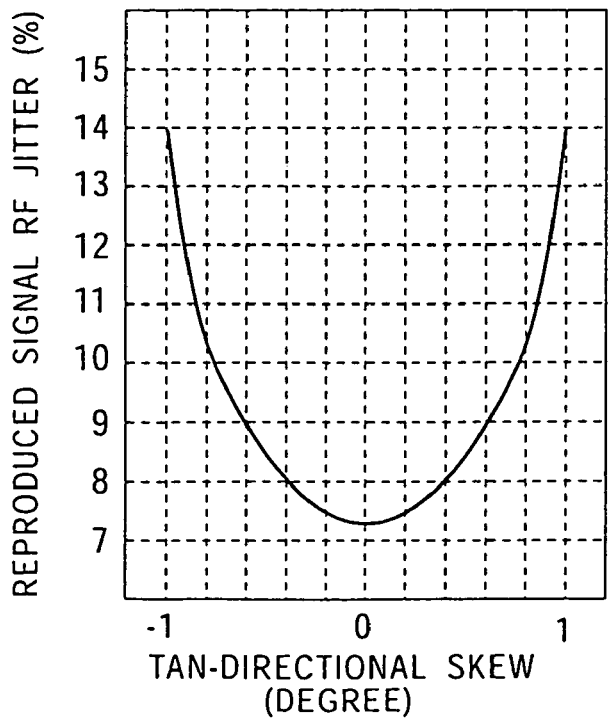
Figure 20A:
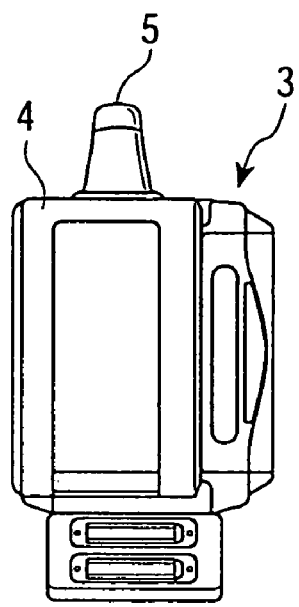
FIGS. 20A and 20B are views respectively explaining external configuration of an optical disc camcorder.
Figure 20B:
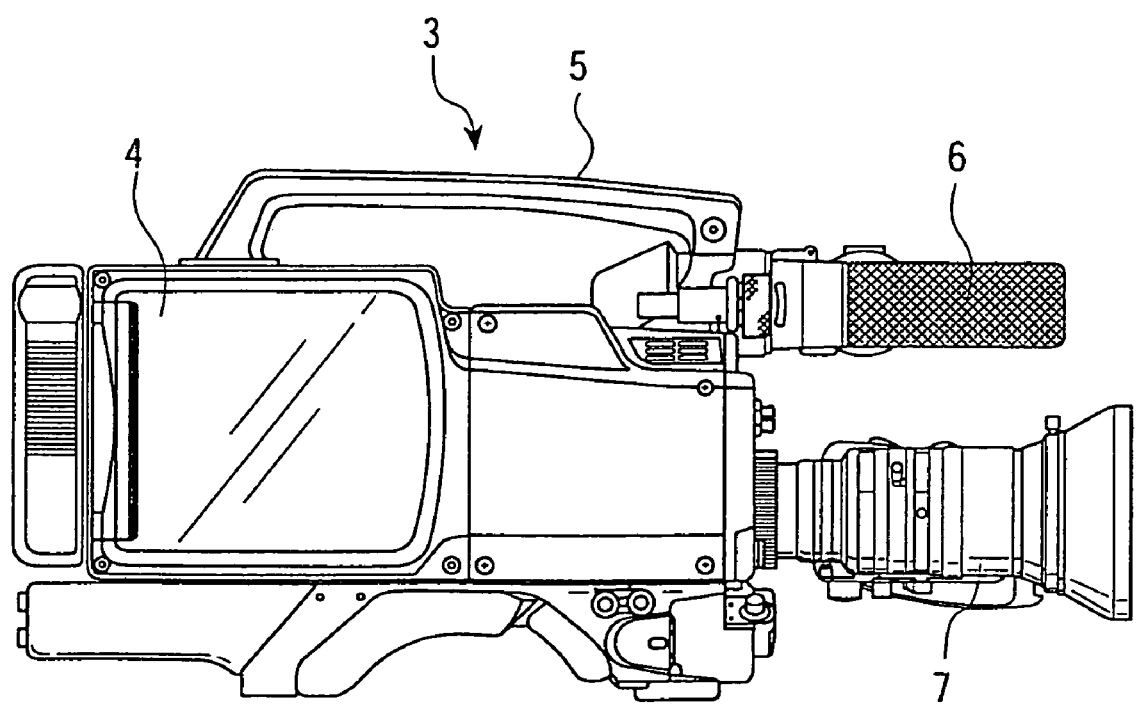
Figure 21A:
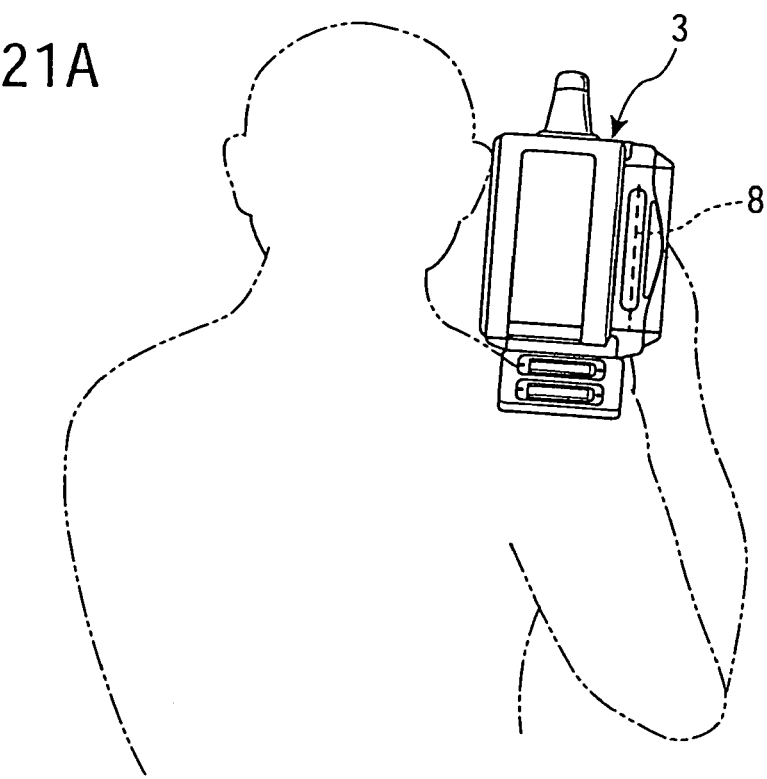
FIGS. 21A and 21B are views respectively explaining an example of posture of a photographer while picking up objective image with a camcorder.
Figure 21B:
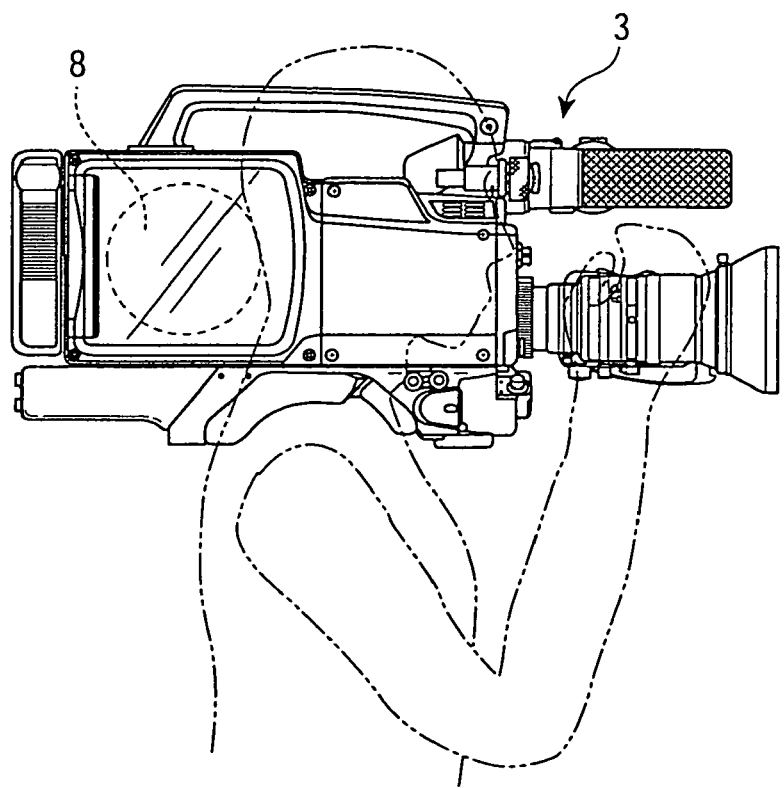
Figure 22A:
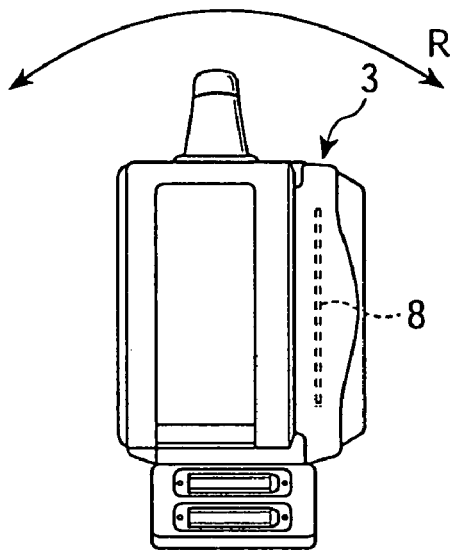
FIGS. 22A and 22B are views respectively explaining rolling phenomenon generated in the camcorder.
Figure 22B:
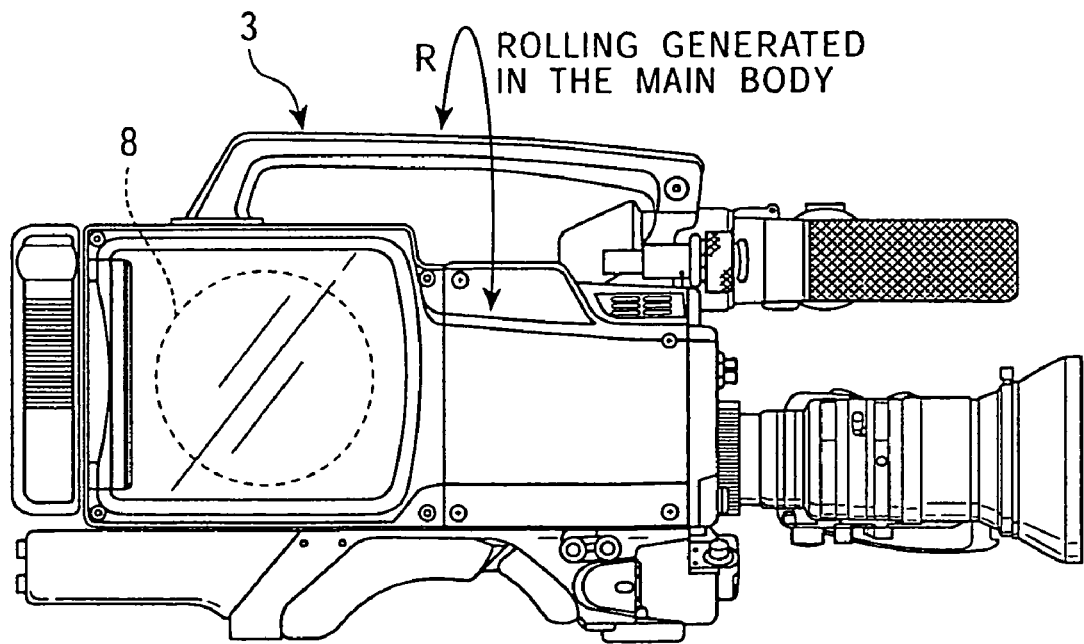

FIGS. 16A to 16C are explanatory views of the variation of distance between the optical disc 306 and an object lens. FIG. 16A designates a state in which the optical disc 306 remains free from being deformed. FIG. 16B designates a case in which the rotary axial position of the SKEW correcting mechanism 309 is set to the end point of the turn table 307. FIG. 16C designates a state in which the rotary axial position of the SKEW correcting mechanism 309 is set to the intermediate circumferential portion being outer from the turn table 307.

As in the practical form of the present invention, when setting the rotary axial position of the SKEW correcting mechanism 309 at the end point of the turn table 307, even after causing tilt angle of the optical pickup system 310 to be varied by the active SKEW correcting mechanism 309 in conformity with deformation of the optical disc 306, distance between the optical disc 306 and the object lens remains unaffected. However, when the rotary axial position of the SKEW correcting mechanism 309 is set to another position such as being outer than the turn table 307, for example, distance between the optical disc 306 and the object lens is variable. This in turn raises problem in that the distance up to the optical disc 306 exceeds focus stroke range allowable for the biaxial actuator in the direction to extend the distance whereby causing focus to be brought into contact with the surface of the optical disc 306. Problem also arises in the direction of narrowing the distance between them in that the optical disc 306 is apt to be abutted with the object lens or the biaxial actuator.

FIGS. 17A and 17B are views respectively explaining the inventive method for preventing the optical pickup system (in particular, the object lens) from being brought into contact with cartridge in a case of inserting or ejecting the optical disc (or cartridge) into or out from the optical disc camcorder body 301 by way of utilizing the active SKEW correcting mechanism 309 featuring the present invention.

After being inserted into the optical disc camcorder main body 301, operation for loading the cartridge into which the optical disc 306 is accommodated into the camcorder main body 301 and operation for positioning the optical disc 306 onto the turn table 307 are serially performed by a cartridge-loading mechanism (not shown). Inasmuch as the distance (i.e., working distance) between the object lens and the optical disc surface 306 is so close to each other about 1.2 mm, there is a potential risk of causing the optical disc 306 or the cartridge 330 to be brought into contact with the optical pickup system 310 in the course of loading operation and to be damaged.

To prevent this from occurrence, as being designated by arrow G shown in FIG. 17A, in the course of loading or ejecting the cartridge 330, the optical pickup system 310 is held apart from the optical disc 306 by the active SKEW correcting mechanism 309. Then, as is shown in FIG. 17B, after securing the optical disc 306 onto the turn table 307, the above-referred risk is prevented from occurrence by way of driving the optical pickup system 310 up to the position at which the skew can fully be canceled (SKEW=0), as shown with the arrow H. Note that arrow K designates processing movement for positioning the optical disc 306 onto the turn table 307.

As has thus been described above, the present invention provides those distinctive practical effects summarized below:

(1) According to the present invention, even when rolling phenomenon is generated in the optical disc camcorder main body proposed by the present invention, the base plate assembly (i.e., the optical-disc drive unit) built in the camcorder main body maintains constant posture being perpendicular to the ground surface all the time, and thus, the optical disc remains free from generation of gyro moment. As a result, positional relationship between the optical axis of the object lens of the optical pickup system and the surface of the optical disc becomes identical to a state being devoid of the generation of rolling phenomenon in the optical disc camcorder despite of the state in which rolling is actually generated therein, whereby making it possible for the built-in base plate assembly to constantly maintain optimal positional relationship (where SKEW=0) to enable the optical disc camcorder of the present invention to constantly secure optimal signal recording and reproduction characteristics. As a result, the optical disc camcorder of the present invention prevents picture image and audio signal from incurring quality degradation otherwise caused by irregularity and dropout of data signal being recorded or reproduced.

(2) The present invention dispenses with such a specific drive system using a drive motor for enabling the base plate assembly built in the optical disc camcorder main body to preserve constant posture being perpendicular to the ground surface. This in turn results in the simplified structure of the whole system to make it possible to prevent gear and motor mechanism from incurring unwanted trouble, and yet, it also results in the decreased cost via the reduction of the number of component parts being used.

(3) When the optical disc camcorder is subject to abnormal amplitude being greater than the rolling phenomenon anticipated during normal service, the optical disc camcorder drive mechanism can be prevented from colliding with the interior of the cubic-type casing via the function of the stopper mechanism composed of the oil-gear-damper. This in turn prevents internal components of the optical disc camcorder from incurring damage even under improper condition of use. Accordingly unwanted repair cost caused by careless handling of the equipment can be reduced. In consequence, the present invention provides such a high quality optical disc camcorder deserving high reliability from the user's viewpoint.

(4) Owing to function of the locking mechanism attached to the rolling-phenomenon preventive mechanism, a movable component (i.e., the base plate assembly) can fully be protected on the way of carrying the optical disc camcorder main body while the internal power supply remains OFF. Further, function of the locking mechanism enables user to smoothly insert or eject the optical disc cartridge into or out from the optical disc camcorder main body, whereby promoting operating convenience.

(5) Even when rolling is generated inside of the optical disc camcorder main body, posture of the base plate assembly, in other words, the optical disc drive apparatus itself, is constantly controlled in the direction of canceling the rolling phenomenon. In other words, by way of constantly preserving stationary posture being perpendicular to the ground surface, the optical disc remains free from being affected by gyro moment all the time. As a result, despite of the presence of the rolling phenomenon actually being generated in the optical disc camcorder body, actual internal condition coincides with a state in which no rolling effect remains inside of the optical disc camcorder main body. Because of this, the optical disc is free from being deformed, and yet, the positional relationship between the optical axis of the object lens of the optical pickup system and the surface of the optical disc is preserved as of the optimal condition (SKEW=0) all the time. This in turn makes it possible for the optical disc camcorder of the present invention to constantly secure optimal characteristic for recording and reproducing data signal. As a result, such a trouble of degradation of picture image and audio signal caused by irregularity and dropout of data signal at the time of recording and reproduction can be prevented.

(6) Total prevention of gyro moment from occurrence in the optical disc even after generation of the rolling phenomenon inside of the optical disc camcorder main body also corresponds to the prevention of the optical disc from being deformed, thus promoting durability of the optical disc to result in the longer storage life of the recorded data signal.

(7) Owing to the above-referred arrangement, it is possible to minimize adverse influence incurred to the axis of the spindle motor and the bearing thereof via gyro moment generated in the optical disc, whereby decreasing the cost for the maintenance service.

(8) Even after causing the optical disc to be deformed by effect of gyro moment subsequent to generation of rolling phenomenon inside of the optical disc camcorder main body, by way of actively controlling the posture of the optical pickup system against the optical disc in order that the amount of SKEW generated between the optical axis of the object lens of the optical pickup system and the surface of the optical disc can always be held on zero, it is possible to constantly secure optimal characteristics for recording and reproducing data signal. Accordingly, it is also possible to prevent unwanted trouble such as irregularity and dropout of picture-image or audio signal otherwise caused by recording and reproduction of such data beyond error-correcting capability in the course of performing image-pickup (i.e., recording) operation or reproduction of recorded data.

(9) Owing to the provision of the rotary axis for controlling the posture of the optical pickup system at the end point of the turn table, even when varying the posture of the optical pickup system in correspondence with deformation of the optical disc, distance between the object lens and the surface of the optical disc is held on constant all the time. Because of this arrangement, it is also possible to prevent focus from being lost and also prevent the optical disc surface from being brought into collision with the object lens, and yet, also prevents unwanted trouble such as irregularity or halt of picture-image and audio signal from occurrence while performing recording or reproduction thereof.

(10) By way of arranging the optical pickup system to be apart from the optical disc surface in the course of inserting and ejecting the optical-disc loaded cartridge into and out from the optical disc camcorder main body, it is possible to assuredly prevent the object lens from coming into contact with the cartridge, whereby securing high reliability of the entire system.

Although the invention has been described in its preferred form with a certain degree of particularity, obviously many changes and variations are possible therein. It is therefore to be understood that the present invention may be practiced otherwise than as specifically described herein without departing from the scope and the spirit thereof.

What is claimed is:

1. An optical disc camcorder comprising:
a base plate assembly;
a pair of rotary shafts; and
a camcorder main body having an internal sub-chassis,
wherein said base plate assembly is mounted on said sub-chassis,
wherein each of said rotary shafts is individually attached to opposite ends of said sub-chassis along a longitudinal axis so that said sub-chassis is swingably attached along a longitudinal axis of said pair of rotary shafts and said base plate assembly rotates axially about each rotary shaft, and
wherein a weight is attached to a first portion of said base plate assembly so that the center of gravity of said base plate assembly is shifted towards the first portion, and
wherein the first portion of said base plate assembly is located below said pair of rotary shafts so that said base plate assembly freely rotates about said pair of rotary shafts to preserve a constant posture based on the position of the center of gravity of said base plate assembly relative to said pair of rotary shafts.

2. An optical disc camcorder comprising:
a camcorder main body having an internal sub-chassis,
a base plate assembly mounted on said sub-chassis;
rotary shafts disposed along a longitudinal axis, said rotary shafts being swingably attached to said sub-chassis,
wherein said base plate assembly is adapted to rotate axially about each of said rotary shafts.

* * * * *